Jan. 5, 1943.  W. F. ROSS  2,307,238
MACHINE FOR AND METHOD OF GRINDING GEARS,
SPLINES, AND SIMILAR FORMS
Filed Oct. 30, 1939  17 Sheets-Sheet 1

Walter F. Ross.
INVENTOR.

BY Stanley Lightfoot
ATTORNEY.

Walter F. Ross,
INVENTOR.

BY Stanley Lightfoot
ATTORNEY.

Jan. 5, 1943.          W. F. ROSS          2,307,238
   MACHINE FOR AND METHOD OF GRINDING GEARS,
         SPLINES, AND SIMILAR FORMS
            Filed Oct. 30, 1939          17 Sheets-Sheet 10

Walter F. Ross.
INVENTOR.
BY Stanley Lightfoot
ATTORNEY.

Jan. 5, 1943.  W. F. ROSS  2,307,238
MACHINE FOR AND METHOD OF GRINDING GEARS,
SPLINES, AND SIMILAR FORMS
Filed Oct. 30, 1939   17 Sheets-Sheet 12

INVENTOR.
Walter F. Ross.
BY
Stanley Lightfoot
ATTORNEY.

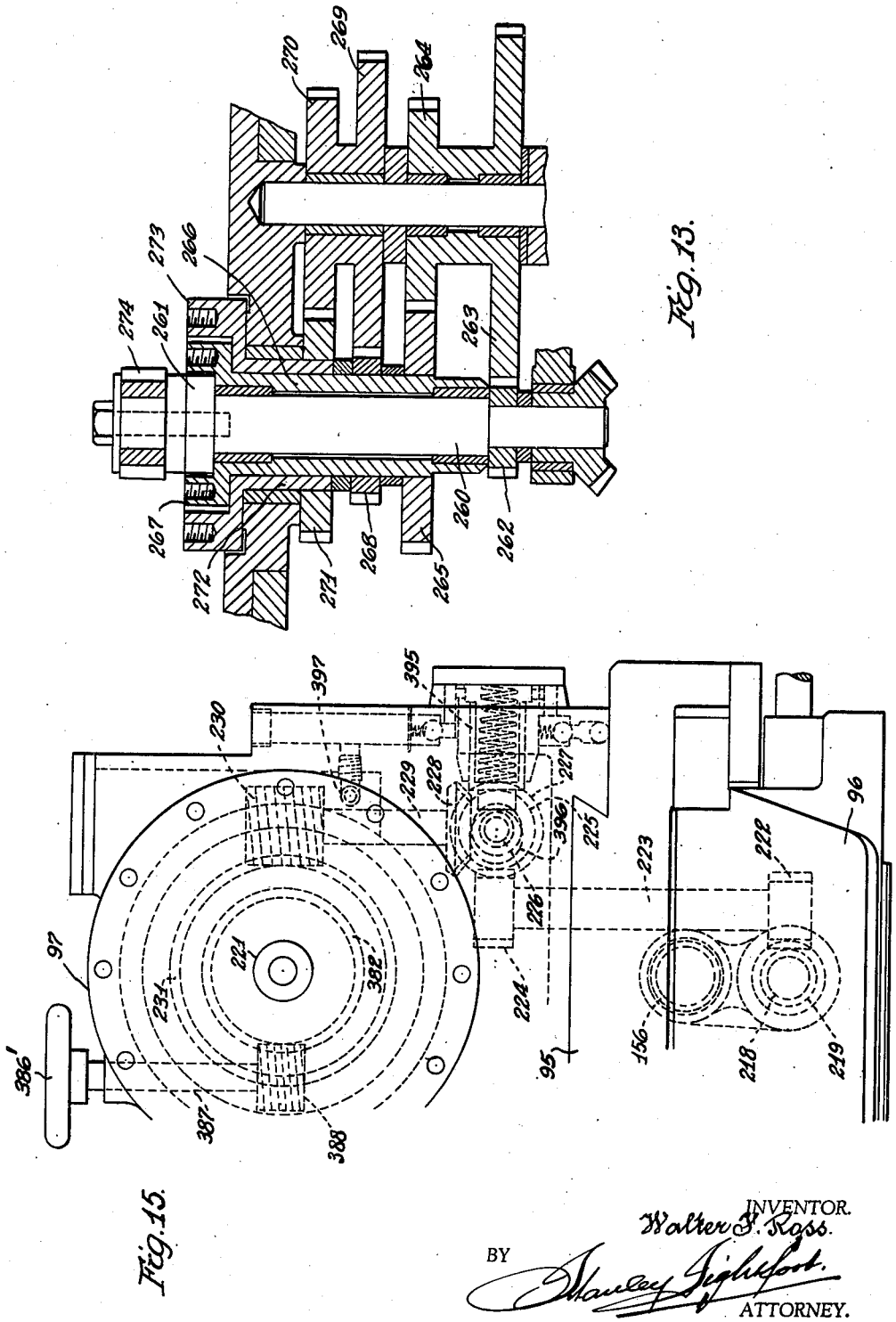

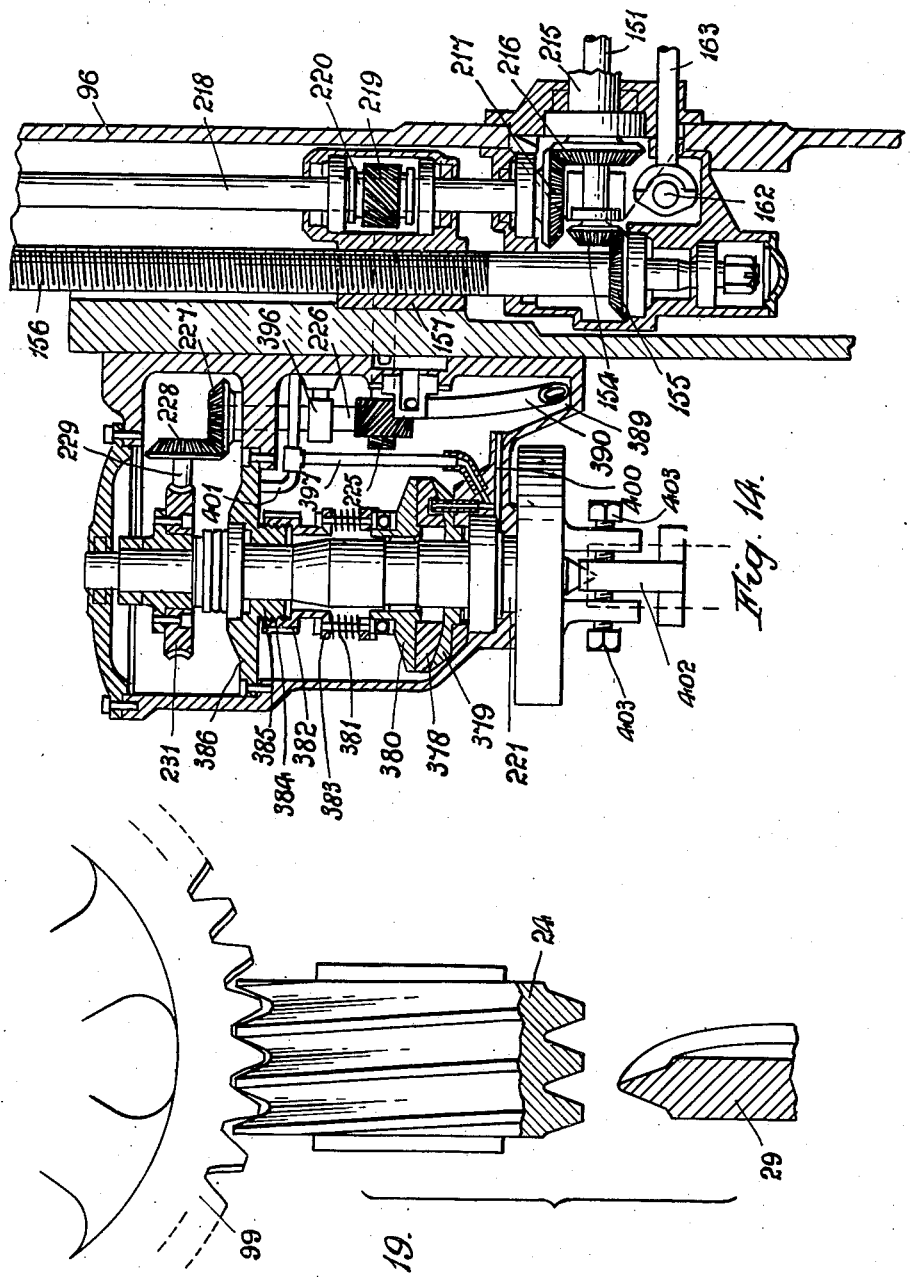

Jan. 5, 1943.    W. F. ROSS    2,307,238
MACHINE FOR AND METHOD OF GRINDING GEARS, SPLINES, AND SIMILAR FORMS
Filed Oct. 30, 1939    17 Sheets-Sheet 15

INVENTOR.
Walter F. Ross.
BY Stanley Lightfoot
ATTORNEY.

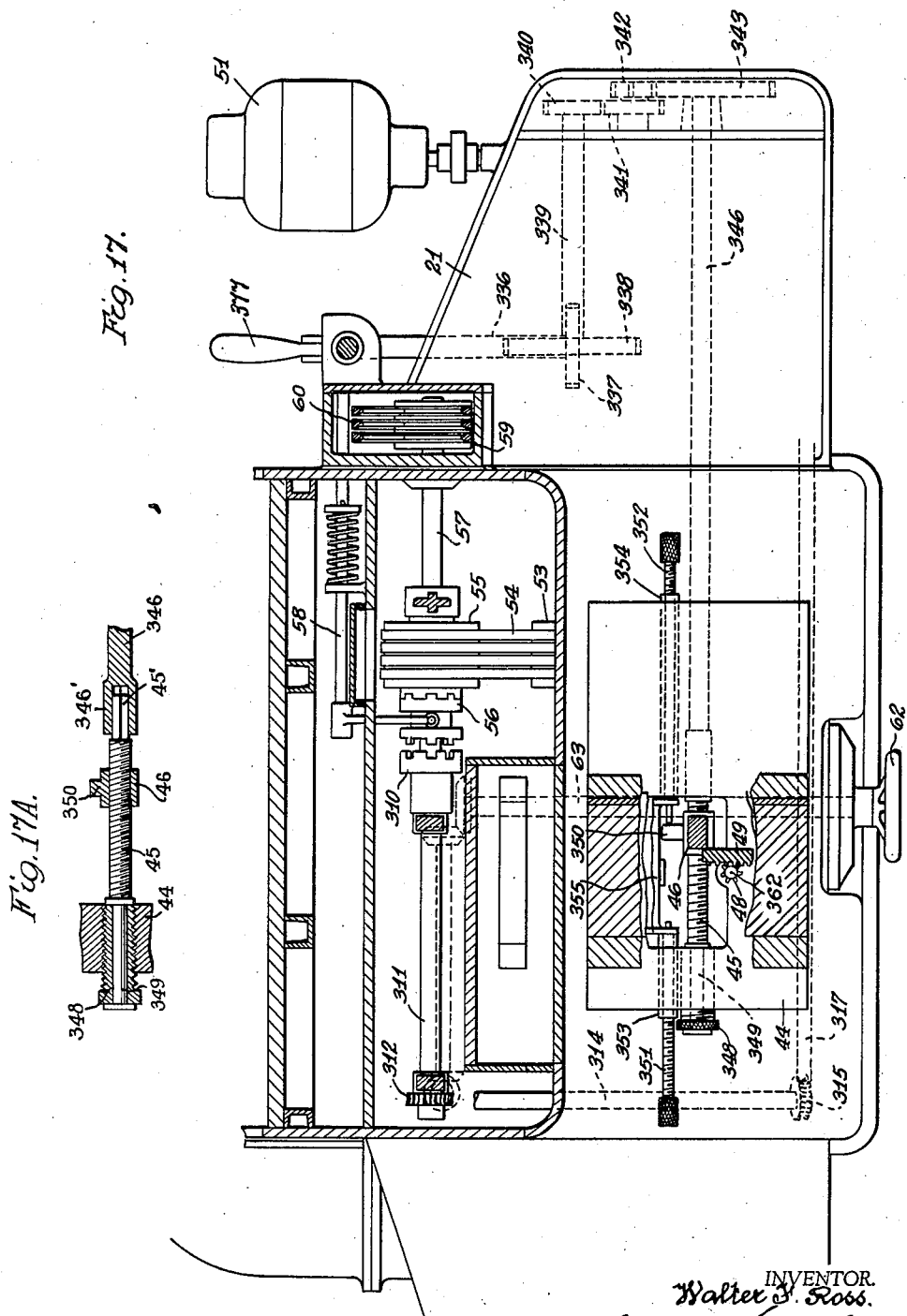

Jan. 5, 1943. W. F. ROSS 2,307,238
MACHINE FOR AND METHOD OF GRINDING GEARS,
SPLINES, AND SIMILAR FORMS
Filed Oct. 30, 1939 17 Sheets-Sheet 17
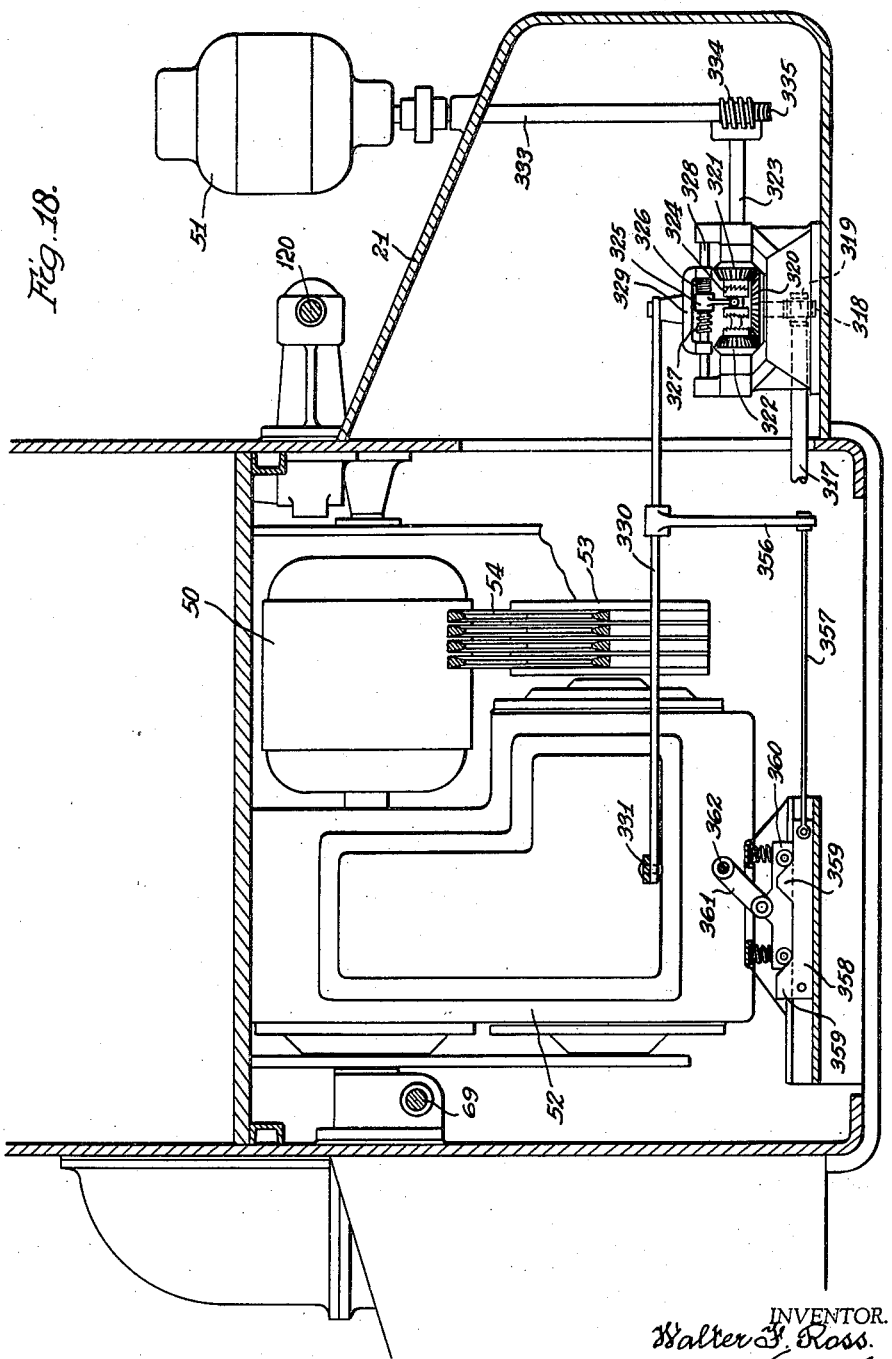
INVENTOR.
Walter F. Ross.
BY
Stanley Lightfoot.
ATTORNEY.

Patented Jan. 5, 1943

2,307,238

UNITED STATES PATENT OFFICE 2,307,238

MACHINE FOR AND METHOD OF GRINDING GEARS, SPLINES, AND SIMILAR FORMS

Walter F. Ross, Detroit, Mich.

Application October 30, 1939, Serial No. 301,918

10 Claims. (Cl. 51—71)

The object of the present invention is to provide for the finish forming of gear teeth, lobes or similar forms by such means and in such manner that gears or forms of great perfection and tooth or formed surface fidelity both as to contour and spacing may be produced, such gears and forms as a result having a correspondingly higher degree of practical strength with noiseless operation and being capable of production practically without restriction as to tooth or other form. The invention also proposes to secure relatively high work output at low cost without dependence upon the skill of the operator and under conditions which will not readily allow of error on the part of the operator.

Although the invention is not limited in its application to the formation of gear teeth only, it will be hereinafter generally referred to in connection with the finishing of gear teeth only, with the understanding that such description also refers by implication to other forms of teeth, lobes, forms and the like.

It is also an object of the invention, by its means and method of operation, to eliminate indexing and the errors common thereto, and to produce a finished, hardened and ground gear or part in which no lapping is necessary, and in which scaling, shrinkage and distortion of the finished gear, such as occurs under present methods where hardening is resorted to after the gear has been cut, is corrected and in which a true concentric pitch circle may be accurately attained.

A further object is to insure, by the means and method of operation of the invention, marked evenness of tooth spacing and the finish grinding of a gear or work completely in one setting and without requiring the inversion of the gear or work to complete the tooth form as in those grinding methods wherein one side of the tooth is ground at a time. The proposed means and method are readily applicable to tooth forms of great variety and number, and not necessarily restricted to gears as such, being readily adaptable to the finish forming of splined, cammed, lobed, and innumerable other such forms. The means and method of the invention will further permit the provision of hardened gears for general use where hitherto, due to manufacturing difficulties which are by this invention overcome, soft gears have been used in the interest of accuracy but at the expense of durability.

It is also an object of the invention to obviate the high expense and necessity of ground hobs and tooth-shaving machines such as are at present used to secure accuracy and eliminate cutter marks, distortions and errors resulting from intermediate gear cutting operations such as are now commonly resorted to.

An important object of the said invention is to provide a main grinding wheel having a thread formed thereon in such a manner that the section of the wheel face taken normal to the helix is the conjugate of the normal pitch of the gear being ground and which is accurate and specifically adapted to the contour of each specific size, style, and space of tooth; and which is further adapted to progressively grind the full form of each tooth simultaneously on both sides around the gear in continuous cutting relation thereto, without the indexing which is usually called for.

A further important object is to provide for the reduced reproduction of an enlarged pattern of the required conjugate rack tooth space section by steps which include the dressing of the said form of tooth section by pantograph control on a dresser wheel, and the recessing of such form by said dresser wheel in the surface of the grinding wheel as a helix having the normal pitch of the normal pitch of the teeth to be ground in the work. The invention also contemplates formation of such helical grinding wheel with a face width of some whole multiple of the helix lead as a means of insuring running balance.

Still further, it is an important object of the invention to provide for control of rotation of the gear through a plurality of differential gears so interrelated that the speed of gear rotation may be readily adapted to a variety of numbers of teeth far in excess of that for which ordinary feed change gear combinations are usually adaptable.

The invention also contemplates combination of such interrelated differentials with means controlling the motion of the gear for the grinding of helical teeth, and for the grinding of taper teeth and special forms.

A still further object of the said invention is to provide novel means for the elimination of torque flutter in the transmission of power to the work.

Still further objects or advantages subsidiary to the aforesaid objects, or from the construction or operation of the invention as it may be carried into effect, will become apparent as the said invention is hereinafter further disclosed.

In carrying the said invention into effect, I may provide a gear or form grinding machine comprising, in general, a large rectangular base structure having mounted on the center portion a main grinding wheel characterized by its being provided with a helical thread of a cross section at right angles to the lead thereof which is the conjugate rack of the normal pitch of the gear to be ground; and in advance of said grinding wheel a dresser wheel driven by a small motor mounted for adjustment to angular positions about a horizontal axis at right angles through the axis of rotation of the dresser wheel, whereby said dresser wheel may be set at an angle equivalent to the helix angle to be dressed on the main grinding wheel.

Suitable mechanism is provided to effect the movement of the dressing wheel in a direction parallel to the axis of the main grinding wheel to adjustable limits in either direction, and to effect its movement into and out of working position relative to the said main grinding wheel at opposite ends of its working travel, much in the manner of the action of a threading tool when used in a lathe. Means for progressively feeding the dresser wheel into the grinding wheel to promote the dressing cut are also provided.

For the formation of the required contour of the margin of the dressing wheel in order that it may produce the proper helix section on the main grinding wheel, I may provide on the forward end of the machine a pantograph mechanism adapted to translate the template-controlled motion of a tracer disc into reduced motion of a dressing diamond which may be moved up to the aforementioned dresser wheel to effect its dressing, the diamond being accurately lapped and polished, in so far as its active edge is concerned, to a circular cross section whose diameter is a fraction, (say, one-tenth) of that of the tracer disc. A template having the form of the rack tooth space to be ground by the main grinding wheel, and in the same proportion thereto as the tracer disc is to the diamond (say, 10 times the section) is suitably mounted on the machine for guidance of the tracer disc during the operation of dressing the dresser wheel by the said diamond.

On the rear part of the machine, I propose to mount the work handling mechanism which may be in the form of a trunnion carrying the work table mounted for rotation in a plane transverse of the machine to permit the grinding of helical gears of any lead angle, feed change gear control being provided to control traverse of the work table in the direction of its length and high speed reverse operation of the said work table when its working stroke is completed. The gears to be ground may be mounted either singly or in groups on suitable arbors carried between a headstock and tailstock on the work table, these arbors being equipped with special dogs adjustable to secure a definite rotary position of the work in reference to the tooth space of the gears to insure proper register at all times with the helical form on the grinding wheel.

The grinding wheel and the work are coupled for operation in synchronized unison from a common source of power and the work rotating mechanism may and preferably includes a main differential, the pinion-carrying section of which is under the control of an auxiliary differential. From a main constant-speed shaft power is directed through change speed gears to produce rotation of the work around its own axis, and also directed through other change speed gears to produce the desired feed motion and rapid return of the table.

For the grinding of helical gears I propose to bring into operation a further change gear train which causes the work spindle to lose or gain one revolution in a work travel distance equal to the helix lead, said last mentioned gear train deriving its operating force from the movement of the work table; and to adapt the machine to the grinding of taper forms, such as milling cutters, taper spline shafts and gear generating cutters, I may provide further gearing also coupled to the work table feed to advance the work towards the main grinding wheel as it traverses the same.

Since accuracy in grinding is of prime importance and the transmission of power through shafting and gearing may result in a certain torque flutter, I propose to incorporate in the machine an adjustable pressure brake as close to the working end of the said work spindle as possible, and means for adequately lubricating and cooling the said brake.

All of which is more particularly described and ascertained hereinafter, by way of an example, having reference to the accompanying drawings, herein:

Figure 3A is a diagram illustrating the pantograph linkage associated with the form template;

Figure 13 is a horizontal detail section of the selective gear train taken on a plane indicated by the line 13—13, in Figure 4;

Figure 14 is a vertical section of the headstock and adjacent parts of the work table;

Figure 15 is a partial plan of the said headstock;

Figure 17 is a horizontal section of the forward end of the base structure taken on a plane indicated by the line 17—17, in Figure 16;

Figure 17A is a detail sectional view illustrating the adjustable mounting of the dresser wheel feed screw;

Figure 18 is a horizontal section taken on a plane indicated by the line 18—18, in Figure 16; and Figure 19 is a detail plan of the work, grinding wheel and dresser wheel showing their relation one to the other.

Figure 1:
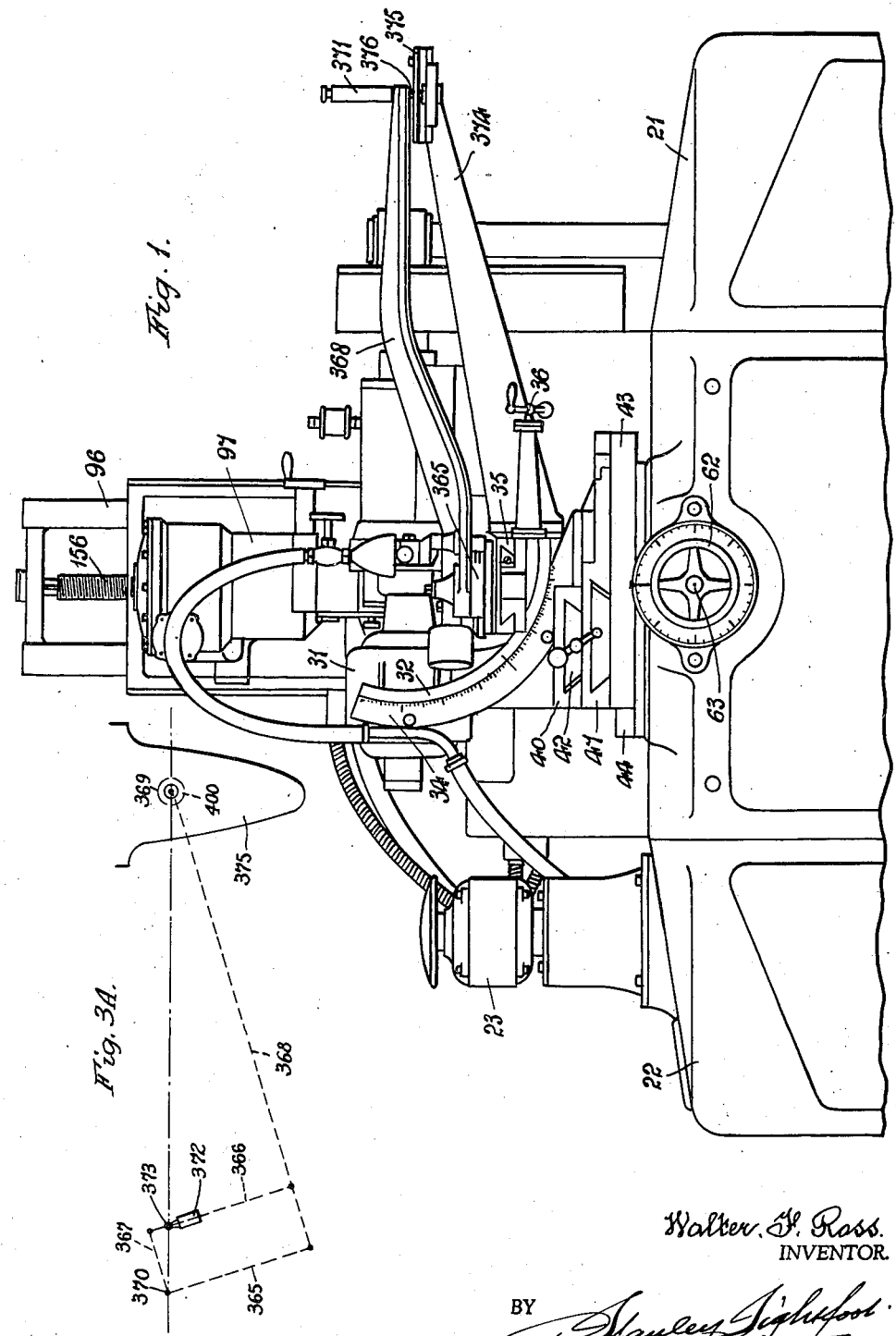
Figure 1 is a front end elevation of a machine embodying said invention.
Figure 2:
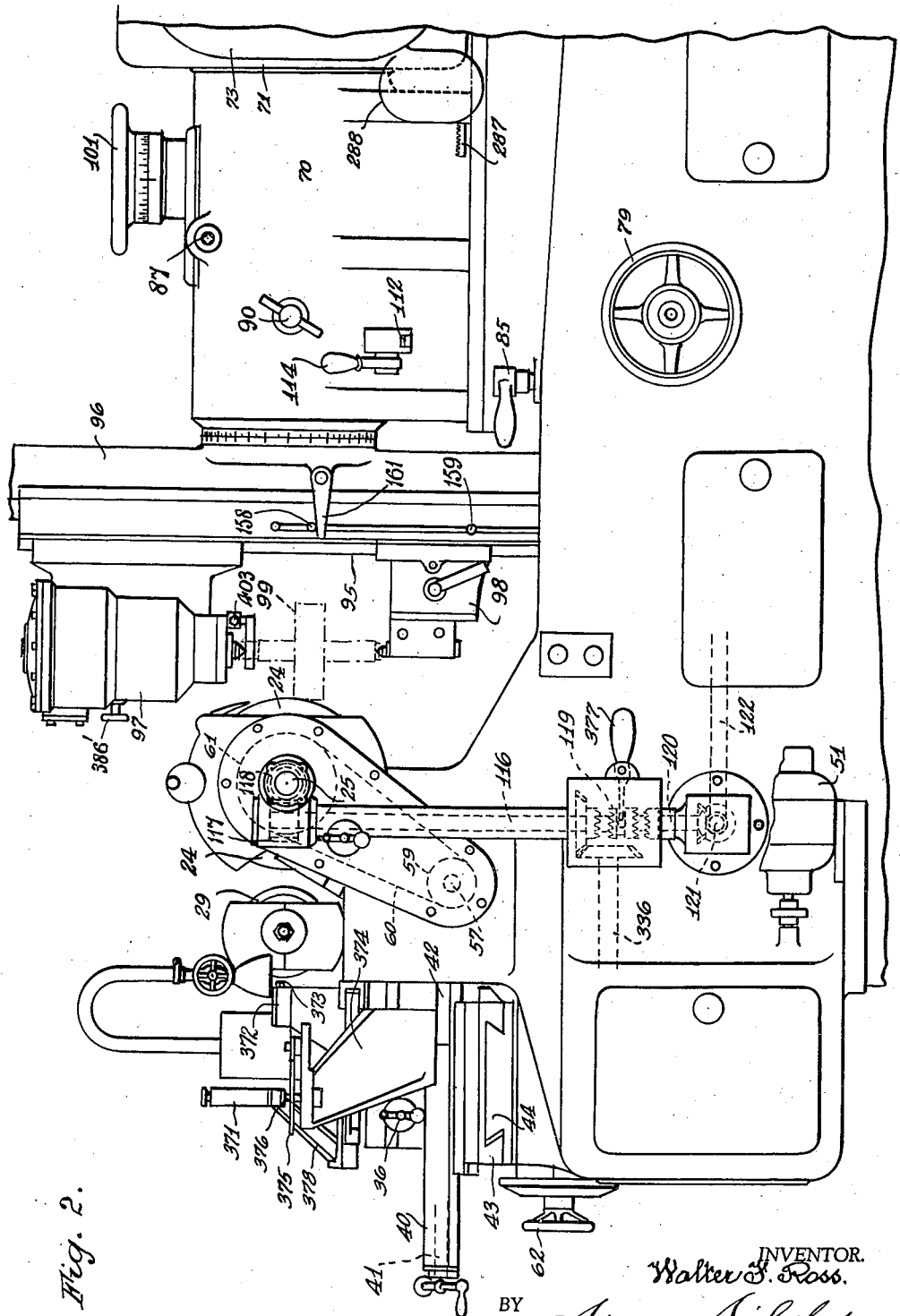
Figure 2 is a side elevation of the major front portion of the same.

Similar characters of reference indicate similar parts in the several figures of the drawings. Certain supporting structure which would interfere with a clear illustration of the mechanism and which is not necessary to an understanding thereof is eliminated from some of the sectional illustrations of the drawings.

The machine, as illustrated, has a substantially rectangular base structure 20 with chambers 21 and 22 extending laterally from its forward portion, the chamber 21 enclosing part of the dresser feed mechanism to be later described, and the chamber 22 merely a reservoir for coolant which is pumped therefrom by the motor 23 to such parts of the machine as may be required in accordance with common practice.

Intermediate of the length of the machine is the main grinding wheel 24, the spindle 25 of which is rotatively carried by a slide 26 parallel thereto and adjustable transversely of the machine in ways 27 by a manual feed screw 28.

Positioned on the machine in advance of the main grinding wheel 24 is a dresser wheel 29 mounted on the spindle 30 of a motor 31, which motor is carried by an arcuate member 32 for swinging movement about the center of the dresser wheel 29 by virtue of its being rotatable in arcuate ways 33 of a quadrant support 34. Also carried by the motor support member 32 is a pantograph table 35, movable on the said member 32 from one dresser wheel 29 by means of the manually operable adjusting shaft 36 through the medium of gears 37 and 38 and of the feed screw 39.

The quadrant support 34 and the previously described elements mounted thereon is movable longitudinally and transversely of the machine by reason of its being in turn provided with a saddle 40 adjustable lengthwise of the machine on a slide member 42 by means of the manual adjusting screw 41. The slide member 42 is also carried by a saddle 43 transversely moveable of the machine on the cross slide 44 under the influence of a feed screw 45 engaging in a nut 46 on the underside of the said saddle 43, the means of operating the said feed screw 45 being later referred to. The slide 44 is also capable of reciprocation in the direction of the length of the machine by virtue of its being mounted on a longitudinally slidable member 47 which receives its motion from a pinion 48 engaging a rack 49 on the underside of the said member 47, the source of operation of the pinion 48 being also referred to in detail hereinafter.

From the foregoing arrangement of slides it will be seen that provision is made whereby the dresser wheel 29 and the main grinding wheel 24 are movable relatively to each other in practically all directions, and in the illustrated example all of these adjustments and movements are for convenience associated with the said dresser wheel 29, the main grinding wheel 24 in this case being non-adjustably mounted on the machine except insofar as the manual cross feed by the said screw 28 is concerned. This cross feed of the main grinding wheel 24 does not, however, have any bearing on the relationship between the dresser wheel 29 and is simply used on occasion in connection with the grinding of the work in the machine as will later appear.

The main grinding wheel 24 is intended to be driven at a high speed in one direction when performing its gear grinding operation and receiving its power from the main motor 50, but when the thread is being formed on the main grinding wheel 24 by the dresser wheel 29 it is driven in alternately changing directions at low speed, receiving its power from a smaller auxiliary motor 51 which is shown in this case as being situated outside of the extension 21 of the base structure of the machine; the selection of the drive to the main grinding wheel being controlled by a manually operated clutch according to requirements.

When the main grinding wheel 24 is being driven for the grinding of work, it receives its power from the main motor 50 through the medium of a Reeves gear 52, main pulley 53, belt 54, pulley 55, clutch member 56 which rotates with the shaft 57 and is moved into engagement with the said pulley 55 by means of a clutch operating rod 58 under the influence of the clutch handle 381 by suitable bell crank linkage (not shown). Said shaft 57 in turn transmits the power through the pulley 59 and belt 60 to the large pulley 61 of the grinding wheel spindle 25.

62 is the Reeves gear control hand wheel which, through the shafts 63, 66, and 69, suitably geared together, controls the regulation of the said Reeves gear, in the manner well known, to increase or diminish the speed of the main grinding wheel within reasonable limitations to suit varying degrees of wheel hardness or abrasive quality, or to meet other variable grinding conditions, such as differing gear hardness, and so forth.

Nominally it is proposed to proportion the pulleys and the motor speed to provide a countershaft speed of 3600 R. P. M. and a grinding wheel spindle speed of 1800 R. P. M. grinding wheel spindle speed, beyond that permitted by regulation of the Reeves gear, being simply effected by varying relative sizes of the pulleys 59 and 61.

Continued description of the mechanism of the machine and its operation will be confined to that actually involved in the grinding of gears for the present, and the method of preparing the grinding wheel for its work will be thereafter described.

Approximately the entire rear half of the machine is confined to the mechanism for carrying and moving the work relative to the grinding wheel 24, the said main grinding wheel 24 being in this example non-adjustable as to position except for the lateral hand adjustment hereinbefore referred to. This mechanism is housed in the main by a trunnion head 70 and a transmission casing 71 which is flanked by gear boxes 72 and 73, the said trunnion head 70 and transmission case 71 with all the mechanism carried thereby being slidable longitudinally of the machine on a sub-saddle 74. A weight 75 exerts a constant pull on the trunnion head 70, and consequently on the transmission casing 71, through the medium of a chain 76 attached to a depending member 77 on the underside of the trunnion head 70 and passing over a sprocket 78 carried by the said sub-saddle 74.

The said sub-saddle 74, carrying the trunnion head 70 and transmission casing 71 and the parts which they support, is also capable of movement longitudinally of the machine by the coarse adjustment feed wheel 79 through the medium of the cross shaft 80, worm and worm wheel 81 and 82 and the pinion 83, which pinion engages a rack 84 on the underside of the said sub-saddle 74. 85 are the sub-saddle locking screws.

Rotatably mounted in the trunnion head 70 is the trunnion 86, rotary adjustment of which is effected by the table angle control shaft 87, the worm 88 of which meshes with a large worm wheel 89 secured about the said trunnion 86. 90 are trunnion locking screws operating wedge members 91 and 92 to bring friction stubs 93 into locking engagement with an annulus 94 secured about the said trunnion 86.

95 is the work table slidable on the turntable 96 which is secured immediate of its length to the outer end of the said trunnion 86. 97 and 98 are the headstock and tailstock adjustable in the usual manner along the said table 95 to receive the work 99 which may be carried by an arbor 100.

Reciprocal movement of the trunnion head 70, and thus the work 99 toward and from the main grinding wheel 24 is accomplished in general by three different agencies:

Firstly, by means of the coarse adjustment feed wheel 79 operating the sub-saddle 74 as previously mentioned.

Secondly, a fine adjustment by means of the hand wheel 101 which, through the gearing 102, 103, 104, and 105, serves to rotate a feed control shaft 106 rotatably carried in a non-rotatable sleeve 107 which in turn is slidably mounted in a pedestal 108 extending upwardly and forming part of the sub-saddle 74. The rear end of the said feed control shaft 106 is threaded into a normally non-rotatable nut 109 mounted in the rear wall of the trunnion head 70, whereby rotation of the said feed control shaft 106 by the operation of the hand wheel 101 will adjust the trunnion head 70 longitudinally of the sub-saddle 74 by effecting the forward or rearward motion of the feed nut 109.

Thirdly, motion of the trunnion head 70 may be controlled or effected by the coaction of a fixed cam 110, secured on the forward end of the sleeve 107, with a rotatable cam 111, the said cams have coacting faces whereby the rotation of the said cam 111 in one or the other direction will determine the movement of the cam 110 forwardly or rearwardly as the case may be. The forward movement of the said cam 110, and incidentally of the sleeve 107 carrying the feed control shaft 106, is effected against the pull of the weight 75 which constantly tends to move the trunnion head 70 rearwardly on its sub-saddle 74 and therefore imposes the same pull on the shaft 106 through its engagement with the said feed nut 109 carried by the said trunnion head 70.

The rotatable cam 111 is primarily operable by a rack bar 112 extending transversely through the trunnion head 70 below the trunnion 86 and engaging gear teeth 113 formed on the said cam 111, the operation of the said rack bar 112 being effected by one or the other of the feed reverse control levers 114 which actuate pinions 115 engaging the said rack bar. Operation of the said rack bar 112, therefore, effects the major movement of the work to and from the main grinding wheel 24 as will be understood. Further control of this rack 112, resulting in the rapid return motion of the work table 95 upon completion of its working travel, will be referred to in describing the transmission mechanism through which the several motions of the work are effected.

When the machine is being operated for the grinding of gears, the shaft 116, which is driven through gears 117 and 118 from the main grinding wheel spindle 25, is coupled by means of the hand operated clutch 119 with the shaft 120 which, through shafts 121, 122, 123 and 124, operates a gear 125 slidably keyed on the said shaft 124 and enclosed in a housing 126 also slidable on the said shaft 124. This housing forms the lower portion of a tubular member 127 attached to and extending downwardly from the base of the rear portion of the trunnion head 70, through clearance openings in the sub-saddle 74 and in the base structure 20 of the machine, whereby said gear housing 126 may move and carry the gear 125 along the shaft 124 in conformity with such movements of the trunnion head 70 and its transmission casing 71. This tubular member 127 carries a vertical shaft 128, the lower end of which has a gear 129 engaging the slidable gear 125, which shaft 128 is also provided immediate of its length with a bevel gear 130 meshing with the gear 131 of a short horizontal shaft 132 terminating in a worm 133.

The said vertical shaft 128 is also provided at its upper end with a gear 134, the purpose of which will be later explained. This shaft 128 will be hereinafter referred to as the constant speed shaft, operating in the present instance at the same speed as the main grinding wheel spindle 25.

The aforesaid worm 133 meshes with a worm wheel 135 and through the cross shaft 136 drives the outer member 137 of a rapid-return friction clutch, by virtue of the gear 138 meshing with a gear 139 formed or mounted on the said clutch member 137. The same shaft 136 also continues through the side of the transmission housing into the gear box 73 and is there provided with a pick-off pinion 140 which meshes with a pick-off gear 141 provided to determine the required feed range of the work table 95.

The further change gears 142, 143, 144, and 145 continue motion to a cross shaft 146 which through worm and worm wheel 147 and 148 drives a dog clutch member 149. This dog clutch member 149 is on the same axis as the rapid-return clutch, which is also the axis of the trunnion 86, and is supported in the end of the transmission housing 71 by means of a stub shaft 150 mounted in suitable bearings.

Extending forward axially of and through the trunnion 86 from within the dog clutch member 149 is the work table feed shaft 151 which has, however, no direct driving connection with the said member 149 but is adapted to be rotated in a table feeding direction by said member 149 when a component sliding dog clutch member 152, keyed on the said table feed shaft 151, is moved rearwardly into engagement with the said clutch member 149 by the operation of a forked lever 153 by means which will be further explained.

The said work table feed shaft 151 effects the feed of the table through the bevel gear 154 and gear 155 on the table feed screw 156 which is threaded into the table feed nut 157. Extent of reciprocation of the work table 95 on the bed 96 in either direction is controlled by adjustable feed stops 158 and 159.

When the work table 95 has completed its travel in one direction, say upwardly, to a point where the grinding wheel 24 has completely traversed the face of the gear 99, the feed stop 159 lifts the control lever 161 which through pivot 162, cross rod 163, yoke 164, and communicating rods 165 effects the rearward motion of a collar 166 mounted on the trunnion 86.

This rearward movement of the collar 166 effects the swinging of a forked member 167 pivoted at 168 and results in the forward swinging of the depending lever arm 169 which through a push rod 170, acting against a finger 171 on the lower end of a rotatable pin 172, effects the release of a detent 173 from a notch 174 in the rack bar 112. The said detent 173 under the influence of detent spring 175 normally locks the said rack bar 112 in what may be termed the "advance" position wherein the cam 112 is rotated to force the cam 110 forwardly of the sub-saddle 74 with consequent forward movement of the trunnion head 70 to the working position, as described. Consequently, the release of the detent 173 from the rack bar 112, as a result of the operation of the control lever 161 by the stop 159, permits the said cam 111 to freely rotate in a reverse direction under the influence of the cam action of the cam 110 due to the rearward pull thereon exerted by the weight 75. Thus, the work 99 is rapidly removed back from the immediate region of the main grinding wheel 24 upon completion of a grinding stroke of the work table 95.

For clarity of illustration the slidable clutch member 152 on the table feed shaft 151 is shown in the neutral position, although during the upward working travel of the work table 95 this clutch member 152 is actually engaged with the forward drive clutch member 149. To bring about the desired disengagement of the clutch member 152 from the member 149 when the working travel of the work table 95 is completed and the trunnion head 70 moves backward as a result of the lifting of the control lever 161, a reciprocal stop rod 176 is provided extending through the rear end of the transmission casing 71 and having adjustable stops 177 and 178 thereon, between which a finger 179 extends. This finger 179 is carried by an extension bar 180 attached to the rear end of the sub-saddle 74. The forward end of the said stop rod 176 is connected by linkage 181 to the clutch-operating lever 153, so that, when the trunnion head 70 and the transmission case 71 move rearwardly until the finger 179 resists further such movement of the stop 177, the clutch operating lever 153 is influenced to move the slidable clutch member 152 to the neutral position illustrated thereby stopping rotation of the screw 156.

To effect the rapid downward return movement of the work table 95 prior to its again being brought forward to a working position, the rack 112 is still further moved by hand toward the left of the machine by depression of one of the feed reverse control levers 114 whereby the said rack 112 engages and swings outwardly a lever 182. This lever, through a suitably supported shaft 183 and against the resistance of a tension spring 184 effects the corresponding rotation of the stub shaft 185 to which the said shaft 183 is normally connected by clutch members 186 and 187. 188 is a quadrant meshing with a pinion 189 which is threaded on a rod 190 so supported that rotation of this pinion 189 in the direction resulting from the outward swinging of the lever 182 by said rack 112 will cause a rearward motion of the said threaded rod 190, and so, through its connection with the lever 191 which is a continuation of the clutch lever 153 and is pivoted at 192, effect the forward sliding of the clutch member 152 and the closing of the rapid reverse clutch cone in the outer clutch member 137. Rapid reverse motion downwardly of the work table 95 then takes place while the work 99 is free of the grinding wheel 24.

As the return motion of the work table 95 is completed, stop 159 operates the control lever 161 and causes one of the forked arms of the lever 167 to engage and move rearwardly the inner end of the lever 193, which is pivoted at 194, so that its outer end engages the clutch member 186. The resulting movement of the lever 193 de-clutches the members 186 and 187 and thereby frees the pinion nut 189 so that it may automatically return to its original position by the action of the quadrant 188 under the influence of the quadrant spring 195. The purpose of this release of the clutch member 186, and consequently of the pinion nut 189, is to prevent overrunning of the work table beyond the limits for which it has been set even though the operator may continue to hold down the feed reverse control lever 114 longer than is necessary.

To again start an upward feed of the work table 95, one of the hand levers 114 is raised to its extreme upper position, thereby moving the rack 112 in the opposite direction to that previously described and, therefore, forcing the cam 110 forwardly, against the resistance of the weight 75, whereby the trunnion head 70 with its work table 95 is again moved up to the forward grinding position. This forward motion of the trunnion head 70 and its transmission casing 71 also carries the stop rod 176 forward until the stop 178 engages the finger 179, thereby causing said stop rod 176, through the medium of the link 181 and the lever 153, to close the sliding clutch member 152 on the forward drive clutch member 149 and so re-establish the forward feed rotation of the table feed shaft 151.

To secure rotation of the work in the machine, power is taken from the previously mentioned gear 134 at the end of the constant speed shaft 128 through the gear 196, shaft 197 and single toothed clutch 198, 199, to the drive shaft 200. This shaft 200, through change gears 201, 202, 203, and 204, operates the cross shaft 205 and through gears 206 and 207 rotates the rear side gear 208 of a main differential train freely around the table feed shaft 151.

With the differential casing 209 held stationary by virtue of the engagement of its carrier worm wheel 210 with a worm 211, the purpose of which will be later referred to, motion is transmitted from the gear 208 through side pinions 212 and 213 to the forward side bevel gear 214 of the said main differential train. This gear 214 is keyed to the hollow spindle-rotating shaft 215 which, through gears 216 and 217 and shaft 218, drives the slidably mounted gear 219. The said gear 219, by reason of the quill gearing 220 supported from the work table 95, moves together with the work table 95 as will be obvious. The said slidable gear 219 serves to rotate the spindle 221 of the headstock 97 through the medium of the gear 222, shaft 223, gears 224 and 225, shaft 226, bevel gears 227 and 228, shaft 229 and worm and worm wheel 230 and 231, the latter being keyed to the said headstock spindle 221.

The transmission described from the constant speed gear 134 to the headstock spindle provides, by suitable interchanging of gears in the train 201, 202, 203, and 204, for the grinding of gears or work having any regular number of teeth for which the said change gears may be readily set, and, of course, the matter of direction of rotation of the work is simply a question of the introduction of an idler gear into the said train if required. However, the number of teeth in the work to be ground may be such that the reasonably possible combinations of gear change in the said train may not lend themselves to the exact rotational speed called for, and to meet such conditions I provide a second or auxiliary differential 232, the side gears 393 and 394 of which are under the control of shafts 233 and 234 respectively. The pinion elements carried by the casing of the auxiliary differential 232 control the rotation of the pinion carrying member of the main differential through the medium of a sleeve 235 surrounding the said shaft 233 and through the previously mentioned worm 211 carried by the said sleeve 235 and meshing with the worm wheel 210 of the said main differential.

In so modifying the rotational speed imposed by the change speed gear train 201, 202, 203, and 204 through the main differential gearing driving the spindle rotating shaft 215, power is taken from the previously mentioned cross shaft 205 through gears 236 and 237, shaft 238, worm and worm wheel 239 and 240 to the shaft 241. From this shaft 241 the power is transmitted through prime change gears 242, 243, 244, and 245 to the shaft 234, previously referred to, through which the auxiliary differential 232 is operated, and through which the worm 211 is caused to rotate the worm wheel 210 of the main differential casing 209. Such rotation of the main differential casing 209 will, according to its direction, increase or decrease the normal rotational speed imposed in the spindle rotating shaft 215 by the change speed gearing 201, 202, 203, 204.

The foregoing provides the mechanism necessary to the grinding of spur gears, and similar one or more toothed or lobed work in which the face of the tooth or teeth is parallel to the axis of the work; and to provide for the grinding of helical teeth of the work, where the lead of the helix is a function of the work table motion, rotation of the work while being ground must only occur as a result of such table motion, and the mechanism providing such rotation during the grinding operation must of necessity be synchronized with and under the control of the table feed mechanism.

Power take-off for the helix control mechanism from the work table feed shaft 151 is through the sliding clutch member 152 keyed thereto, which member is provided with an integral gear 246 meshing in all positions of slidable adjustment of the said member 152 with a pinion 247. The said pinion 247, through the shaft 248 and gears 249 and 250, drives the vertical shaft 251 and through bevel gears 252 and 253, a shaft 254. From thence, through bevel gears 255 and 256, shaft 257 and bevel gears 258 and 259, the drive is conducted to the shaft 260, and from this shaft selectively to the helix change gears through one or the other of gear combinations designed to secure a very desirable and highly variable range of rotational relation of the work 99 to the feed of the work table 95, whereby a high degree of control of the angular range of helix to be ground may be secured.

With this end in view, I provide the said shaft 260 with a directly attached adaptor 261, the purpose of which is to carry the first gear 274 of a train of helix change speed gears when such first gear of the train is to be operated at the speed of the said shaft 260. However, the shaft 260 towards its inner end carries a gear 262 which, through gears 263, 264 and 265, drives a sleeve 266 surrounding the said shaft 260 and equipped with a flange 267 suitably drilled and tapped to receive a second adaptor (not shown) by which the said first gear 274 of the helix train may be driven by the sleeve 266 at the speed of the said sleeve instead of at the speed of the shaft 260. In the illustrated example, this sleeve 266 rotates at ⅕ of the speed of the shaft 260.

To obtain a still greater reduction, if required, of the speed of the first gear 274 of the helix change gear train, the said sleeve 266 is also provided with a gear 268 which, through gears 269, 270, and 271, drives an outer sleeve 272 surrounding the said sleeve 266 and in turn provided with a flange 273 for receiving an adaptor through which the said first gear 274 of the helix change speed gear train may be operated at $\frac{1}{10}$ of the speed of the said shaft 260. The helix change speed gear train referred to comprises in the illustrated example the gears 274, 275, 276, 277, 278 and 279, the latter being mounted on the shaft 233 which, as previously explained, operates the side gear 393 of the auxiliary differential 232, and so through the center section of the said auxiliary differential 232, operates the worm 211 and its worm wheel 210, and through the said main differential effects the rotation of the bevel gear 214 and the work spindle rotation shaft 215 in a predetermined synchronized ratio to the work table feed.

Provision is also made for the grinding of taper tooth formations, such as in tapered milling cutters, and for this the work table 95 during each working stroke is also fed towards the grinding wheel 24 at a ratio determined by the taper angle desired; and this, therefore, is again a function of the work table feed and must be synchronized therewith.

For such purpose, motion is transferred from the table feed shaft 151 through the sliding gear 246 to a gear 280 mounted on a shaft 281 which, through a worm 282 and worm wheel 283, operates the shaft 284 extending horizontally through the gear box 73 into a casing 285 which houses a gear 286 driven by the said shaft 284 and meshing with the teeth of a rack 287. The said rack 287 is supported by and slidable longitudinally of the machine in the lower part of the said casing 285, and extends forwardly through and is supported in a second casing 288 at the forward end of the gear box 73. The teeth of the rack 287 again mesh with a pinion 289, which through shaft 290 and gears 291 and 292 operates a shaft 293 on which is a worm 294 meshing with a worm wheel 295 carried by the trunnion head feed nut 109. Thus the reciprocation of the said rack 287 in one or the other direction in the manner described effects the rotation of the said nut 109 to cause its timed travel forwardly or rearwardly on the threaded shaft 106, and consequently, through resulting motion of the trunnion head 70, the timed movement of the work toward or from the grinding wheel 24 in a predetermined synchronized ratio to the vertical work table travel.

The single toothed clutch 198, previously referred to, performs a synchronizing function which is necessary to insure proper relationship between the tooth positions of the work being ground and the lead of the formed thread on the grinding wheel 24, whereby this relationship will be maintained whenever the operation of the machine is stopped and restarted (as during the loading of work after the table feed has been stopped) when it is also necessary, of course, for the revolution of the work spindle to cease.

It will be noted that, when the sliding clutch member 152 is moved to its neutral position by operation of the lever 153 in the manner described to stop the feed of the work table 95, and also when the said lever 153 is still further moved to effect the closing of the rapid return clutch to cause the return motion of the table 95, the said lever 153 through the link 296 and bell crank lever 297 disengages the said single toothed clutch 198 from the clutch member 199, thereby disconnecting the shaft 200 from the constant speed shaft 128 with consequent stoppage of the work-spindle rotating mechanism. While so disconnected, the clutch member 198 continues to rotate under the influence of the constant speed shaft 128 in unison with the rotation of the main grinding wheel 24, so that, irrespective of the number of complete revolutions made by the grinding wheel 24 during the loading interval, the said clutch member 198 when eventually re-engaged with the member 199, as the feed clutch member 152 is re-engaged with the driving member 147 to re-establish table feed, will pick up its operation of the shaft 200 at a definitely timed rotational angle in relation to the rotation of the main grinding wheel 24.

The machine described, by the use of the novel form of helically threaded main grinding wheel 24, is capable of producing and finishing gear teeth with great fidelity as to form and spacing and with a finish exceptionally free from waves, flats and other imperfections commonly found in gear teeth as heretofore formed and finished; and to eliminate torque flutter, such as might otherwise result from the transmission of power to the work through shafting and gearing, I provide a friction brake against the resistance of which the work spindle 221 is rotated. This is in the form of an annular brake shoe 378 carried on a support 379 secured in the lower end of the housing of the headstock 97 and having a spherical seat engaging a correspondingly spherical lower face of the said shoe 378, whereby the said shoe 378 may be capable of slight angular self-adjustment on its seat. The brake proper 380, rotatable with the spindle 221, is pressed downwardly into frictional contact with the shoe 378 by compression springs 381, pressure of which is controlled by a nut 382 engaging a collar 383 surmounting the said springs, and which nut 382 is threaded at 384 on a downwardly extending boss 385 of a partition plate 386 located in and secured to the casing of the headstock 97. This brake adjusting nut 382 is provided with gear teeth so that it may be rotated through the agency of the hand wheel 386', shaft 387 and gear 388.

To provide for the cooling and lubricating of the brake surfaces, irrespective of angularity to which the headstock may be swung about the center of the trunnion head, I provide in the base portion of the headstock a semicircular sump 389 from which oil may be drawn by a swingable pick-up pipe 390 which communicates through ducts (not shown) with the inlet of a pump 395 operated by a cam 396 on the shaft 226. The outlet of the said pump 395 communicates through the duct 397 and suitable passageways with the inner bore of the brake shoe 378 and so lubricates the surfaces of the said shoe. Overflow passes out through a passage 400 back to the sump 389. 401 is a by-pass to the upper chamber of the headstock 97 from which oil flows through the spindle bearing back into the lower chamber and so to the said sump 389.

The main grinding wheel 24 which it is proposed to use in the grinding of gear teeth through the agency of the mechanism described, has a characteristic helical thread formed thereon which in section transverse of the lead angle is the conjugate rack for the gear or work to be ground, considered in relation to the normal pitch of such gear and in producing the said form on the said main grinding wheel it is preferably first rough chased on an engine lathe, in relation to certain key ways (not shown) in the wheel hub in order to save time in the dressing operation about to be described.

The dressing operation is effected by the dresser wheel 29 in the form of a disk of emery or the like having its marginal portion formed in cross section as the reverse or counterpart of the spacing of the conjugate rack of the gear to be ground. This cross sectional form of the margin of the dressing wheel 29 it is proposed to produce by the pantograph mechanism which will be later described.

After the rough chased grinding wheel 24 has been mounted on the grinding wheel spindle 25, the clutch 56 is moved towards the left of the machine to engage a clutch member 310, in which position the said clutch 56 is released from the main drive countershaft pulley 55 and now couples the shaft 57 (and consequently the grinding wheel spindle 25) with the slow speed shaft 311. This shaft 311, through gears 312, 313, shaft 314, gears 315 and 316, shaft 317 and gears 318 and 319, is driven in one or the other direction by a bevel gear 320 and obtains its rotation from one or the other of bevel pinions 321 and 322, either of which pinions may be coupled to a drive shaft 323 by a sliding dog clutch 324 keyed to the said shaft 323.

The clutch 324 is actuated by a clutch shifting member 325 located between compression springs 326 and 327 and slidable on the rod 328, in one or the other direction, as one or the other of the said compression springs is loaded beyond a determined degree, a system common in load-and-trip mechanisms. 329 is a spring loading fork the arms of which travel on the said rod 328 and are intended to alternately compress said springs 326 and 327 under the influence of a reciprocating bar 330 connected to the lower end of a lever 331 pivoted at 332.

The shaft 323, operating the forward and reverse pinions 321 and 322 receives its power from the auxiliary motor 51 through the shaft 333 and form and worm wheel 334 and 335. Thus, during the dressing of the said main grinding wheel 24 by the dresser wheel 29, the said main grinding wheel 24 is rotated at relatively slow speed alternatively in opposite directions and is driven by the said auxiliary motor 51. The said dresser wheel 29 is driven independently by its own high speed motor 31.

By adjusting the angle of the arcuate member 32 of the dresser wheel motor mounting, the plane of the dresser wheel 29 may be set to the helix angle which it is desired to form on the main grinding wheel 24, and which has preferably been already roughed out on an engine lathe as stated, and by means of the manual dresser wheel feed screw 41, the said dresser wheel 29 is moved up into dressing position in the roughed-out groove of the grinding wheel 24. The dresser wheel 29 and the grinding wheel 24, being then rotated by the motors 31 and 51, respectively, in the accepted relative directions for efficient dressing of the grinding wheel 24, the said dresser wheel 29 is given a motion similar to that of a threading tool when used in a lathe, the dresser wheel 29 traversing the main grinding wheel face at a controlled rate of travel to generate in the walls of the roughed out groove the desired thread formation, dropping back at the end of the travel to clear the grinding wheel face, then returning to its starting point and being advanced to its predetermined dressing position, following which the said dresser wheel 29 again traverses the grinding wheel face, and so on, until the cycle is stopped by the operator. It will be understood that as the cycle is repeated, the dresser wheel 29 is progressively advanced into the work, as required, by operation of the said dresser wheel feed screw 41.

This lathe like action of the dresser wheel 29 is secured by throwing the clutch 119 into position where it is disconnected from the shaft 120 and connects the shaft 336 with the shaft 116 operated from the grinding wheel spindle 25, which shaft 336, through gears 337 and 338, shaft 339 and change speed gears 340, 341, 342 and 343, operates the dresser travel feed shaft 346 carrying a dresser travel feed screw 45 to the inner socket end 346' of which the squared extension 45' of the dresser travel feed screw 45 reciprocally engages. This feed screw 45 is in turn manually adjustable axially of the said shaft 346 by means of an adjusting screw 348 independently rotatable on an extension spindle 349 of the said feed screw 45 and threaded into one end of the slide 44, whereby rotation of the member 348 will effect longitudinal movement as a whole of the feed screw 45. This effects corresponding adjustment of the dresser wheel 29 crosswise of the machine by virtue of the said wheel 29 being moveable with the slide 43 coupled to the said feed screw 45 by the nut 46. Thus the operation of the said manual adjusting screw 348 serves to determine the lateral adjustment of the dresser wheel 29 to the roughed out groove in the main grinding wheel 24 with which the said dresser wheel 29 is to match. To effect such matching the main grinding wheel cross feed screw 28 may also be utilized, if desired.

When the dresser wheel travel feed screw 45 is rotated in one or another direction, the nut 46 travels along the said feed screw 45 until an extension 350 on the said nut 46 strikes the inner end of one or other of stops 351 or 352, which stops are threaded for adjustment into sleeves 353 and 354 slidably movable in the slide 44 and connected to opposite ends of a link 355 attached to the end of the upper arm of the pivoted lever 331. Such contact of the nut extension 350 with the stop 351 or 352, as the dresser wheel 29 completes its forward travel, or its return stroke, causes the said lever 331 to swing in one or the other direction about its pivot 332 and through the connect-rod 330 and fork 329 snap the reverse clutch 324 out of engagement with one of the pinions 321 or 322 and into engagement with the other of said pinions. In this manner the direction of rotation of the main grinding wheel spindle 25 as well as the direction of rotation of the grinding wheel travel feed screw 45 is reversed.

As the lateral working travel of the dresser wheel 29 is completed in grinding the groove in the main grinding wheel 24, as described, and the connecting rod 330 is operated to reverse the motions and effect the return of the dresser wheel 29 to the beginning of its stroke, it is necessary to withdraw the dresser wheel 29 from the work prior to such return stroke. This may be effected by any suitable mechanism and for the purposes of illustration the connecting rod 330 is shown as being provided with an arm 356 connected by a rod 357 to a cam plate 358 mounted for longitudinal movement by the said rod 357. The lobes 359 of the said cam plate 358 are arranged to effect the movement of a plate 360 at right angles to the movement of the said cam plate 358, as will be readily understood, and, as this plate 360 is connected to the end of a swinging arm 361 on the lower end of the shaft 362 carrying the pinion 48, it will be apparent that such movement of the said plate 360 will result in the rotation of the said pinion 48 in one or other direction according to the direction of movement of the said plate 360. The lobes of the cam plate 358 are intended to be so disposed that through the linkage described and the said pinion 48 they will effect the motion of the rack 49 and the dresser wheel carrying slide 47 to withdraw the dresser wheel 29 from the work as required at the end of each working stroke, and also to advance the wheel 29 to the said work prior to the beginning of each working stroke.

Means are provided for dressing the contour of the counterpart of the conjugate rack form dresser wheel 29 to that of the rack to be eventually ground on the main grinding wheel, such means including the well known pantograph motion, the principle of which does not need to be dwelt upon at length; 365 and 366 being the parallel links connecting the shorter arm 367 to the longer or tracing arm 368 which terminates in the tracing disc 369 which is attachable to the terminal pin 376. 370 is the fixed point (in the form of a pin carried by the pantograph saddle 35 of the machine) relative to which the pantograph system of levers may be manually moved by means of the handle 371 suitably located on the said tracer arm 368.

The link 366 carries an upstanding tracer mount 372 which supports the tracer 373, in this case a wheel dressing diamond, in such position that upon the operation of the pantograph the said tracer will move in a line directly towards or from the axis of the dresser wheel 29 but in a relation to the plane of the dresser wheel 29 determined by the movement of the tracer disc 369.

Figure 3:
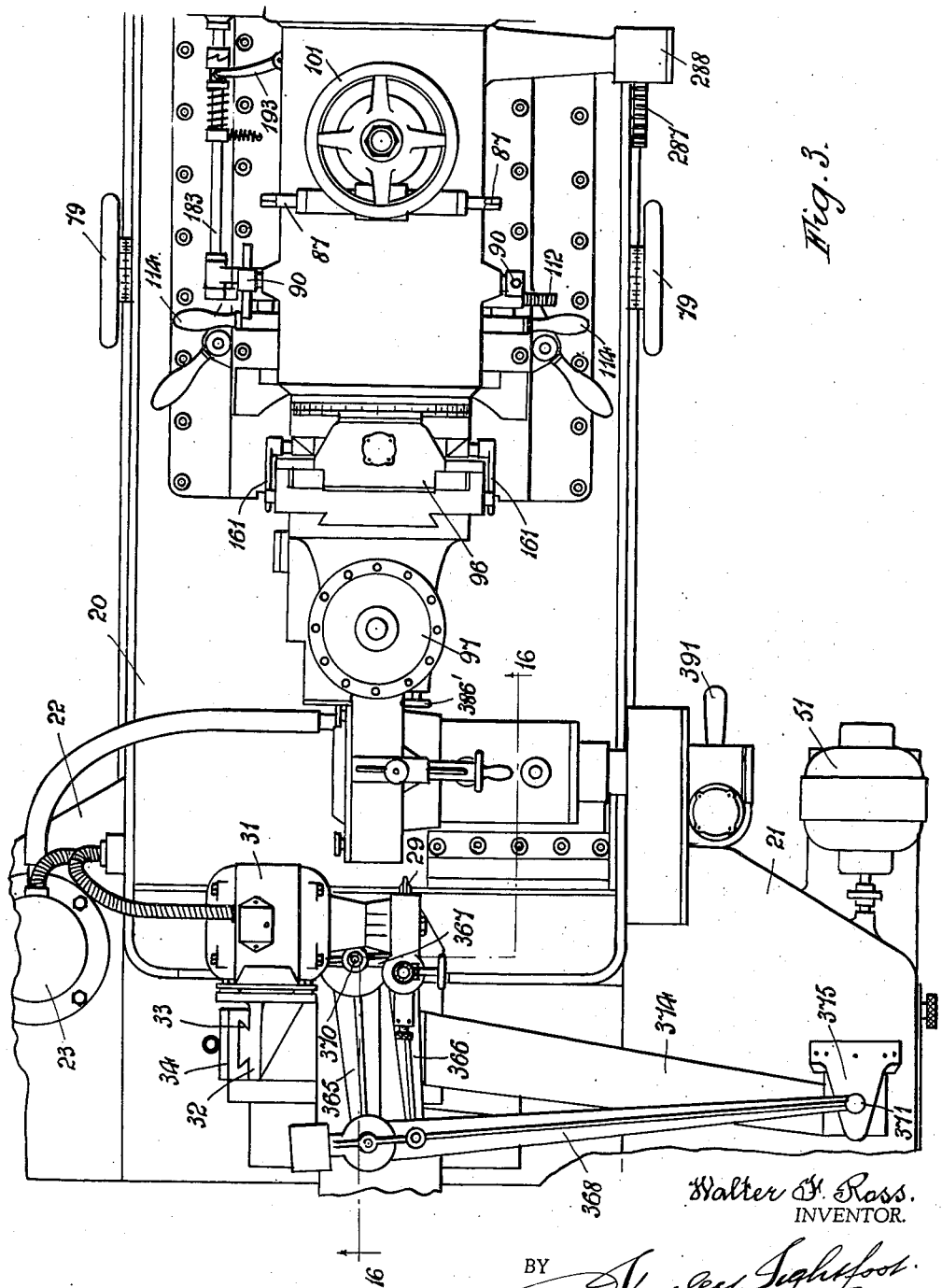
Figure 3 is a plan of the same.
Figure 4:
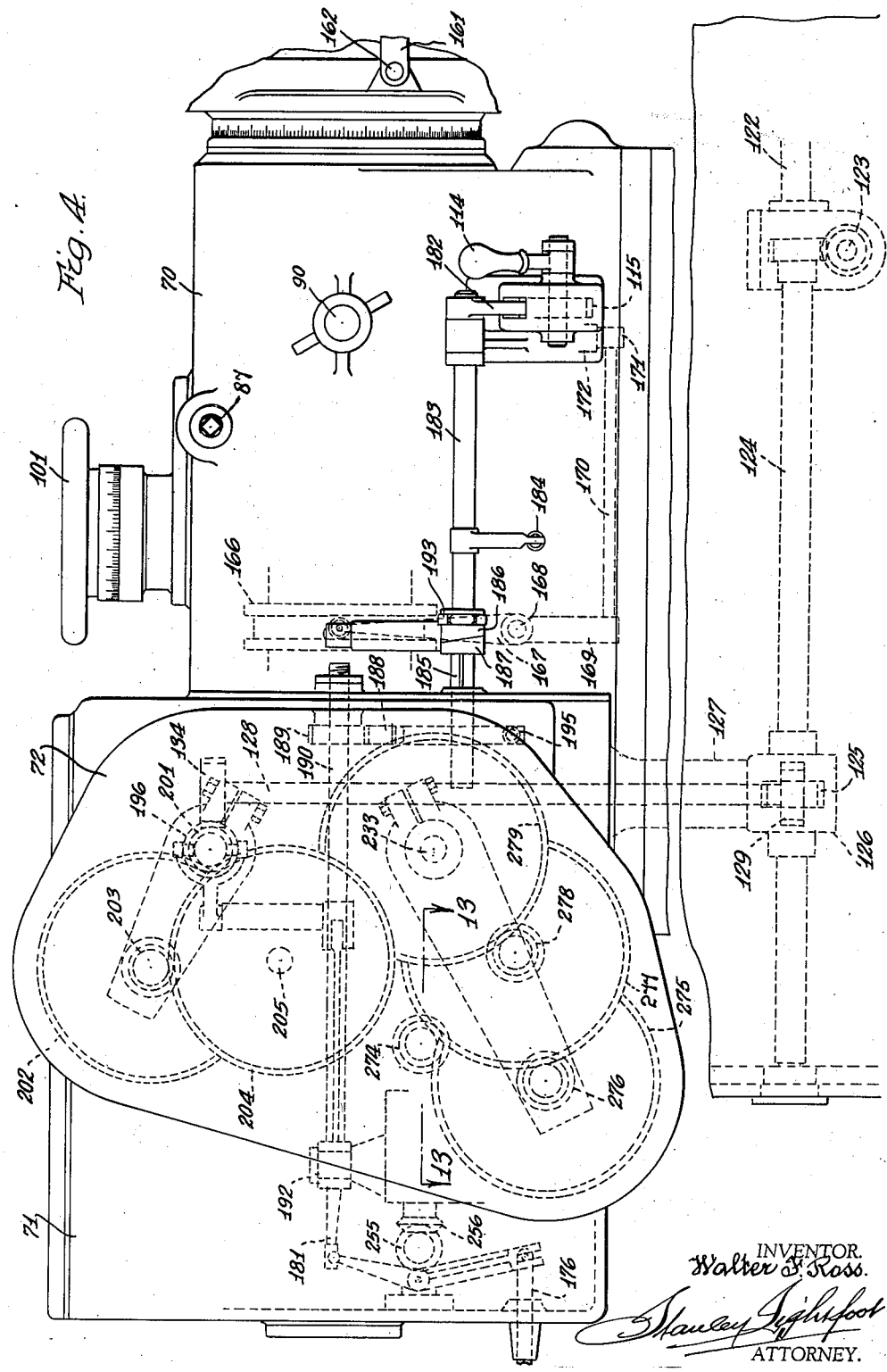
Figure 4 is a side elevation of the major rear portion of the machine looking at the left hand side.
Figure 5:
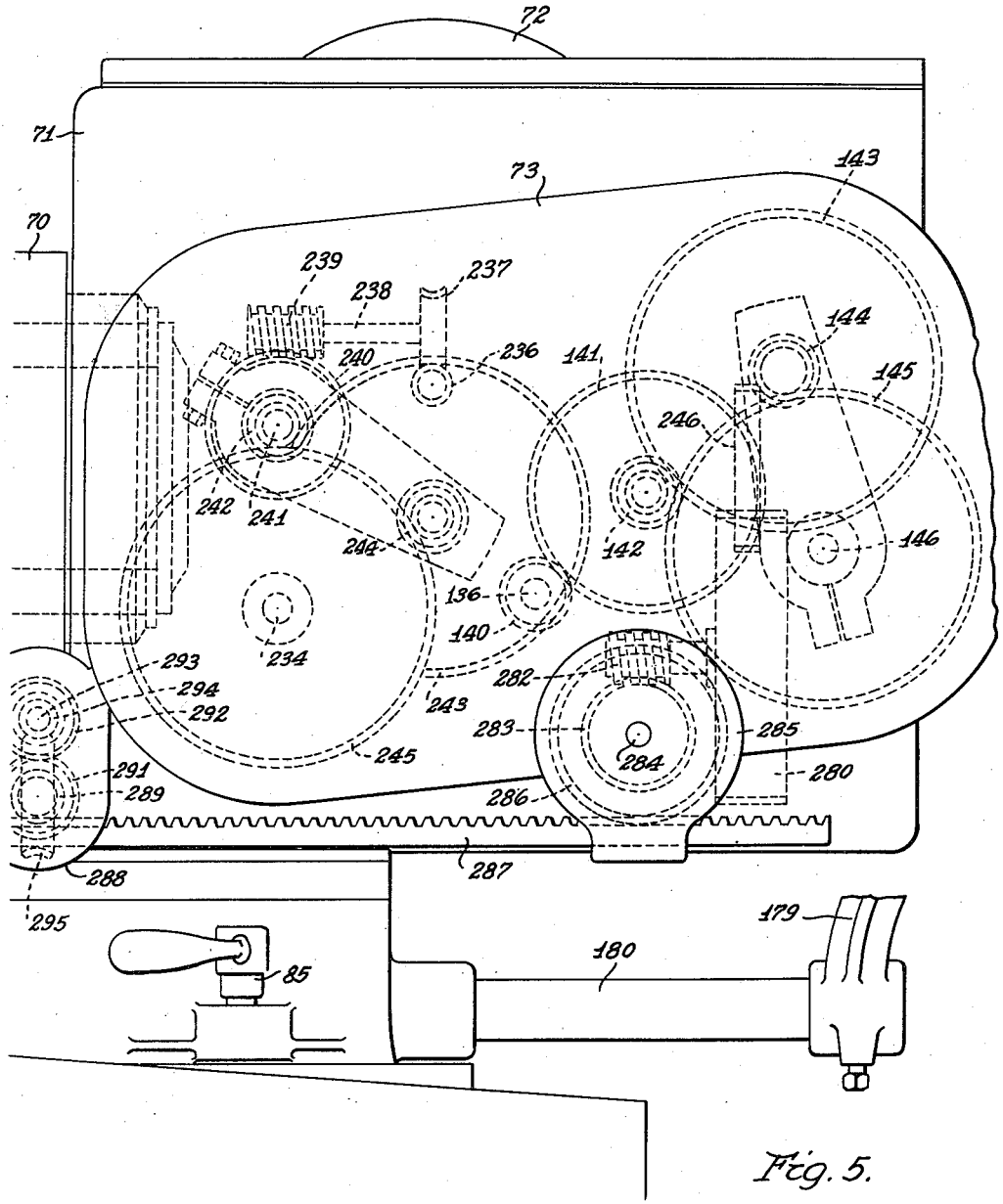
Figure 5 is a side elevation of the right side of the transmission housing of the machine.
Figure 6:
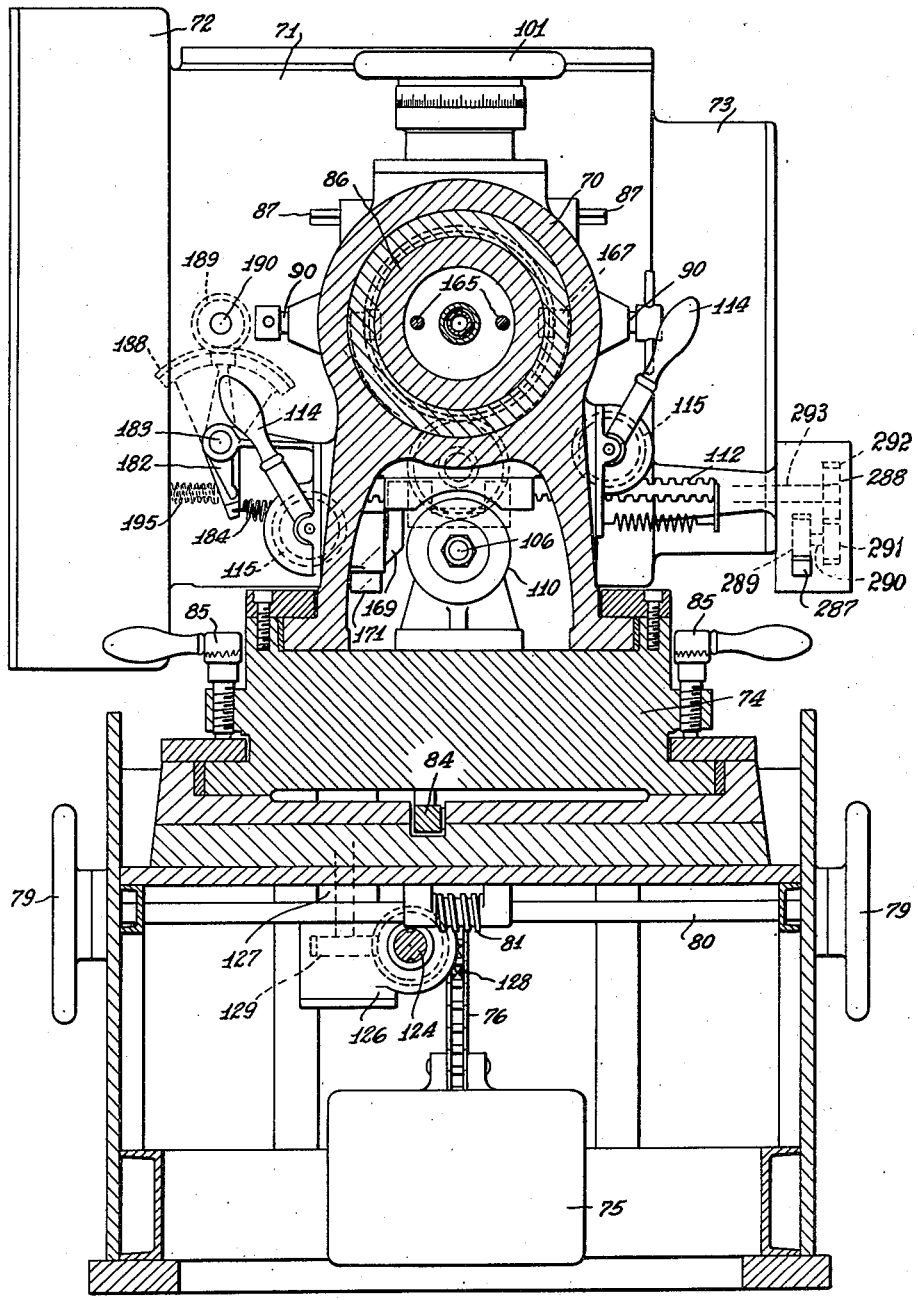
Figure 6 is a transverse section through the trunnion head of the machine taken on a plane indicated by the line 6—6, in Figure 7.
Figure 7:
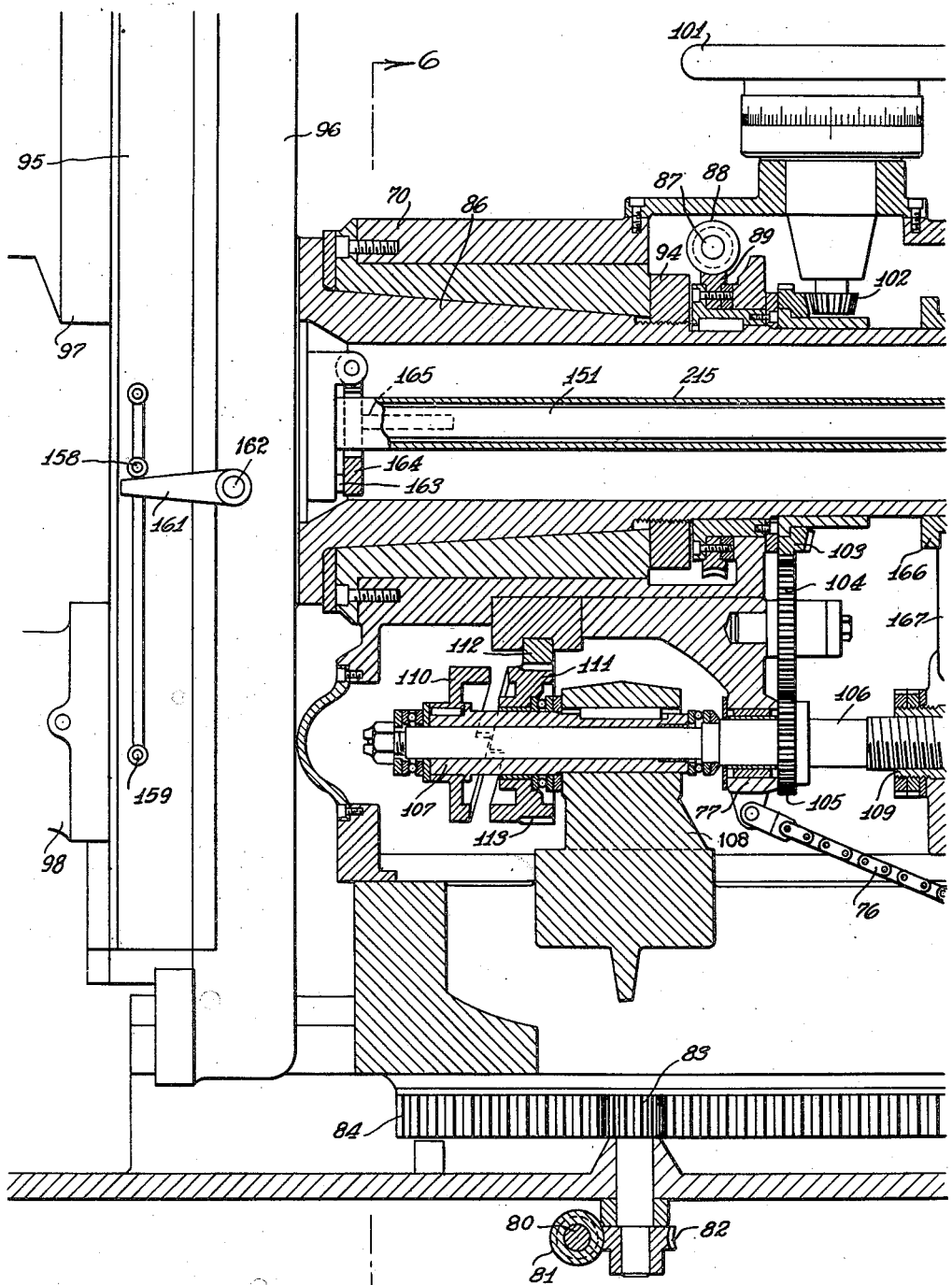
Figure 7 is a vertical section of the trunnion head of the machine taken through the axis thereof.
Figure 8:
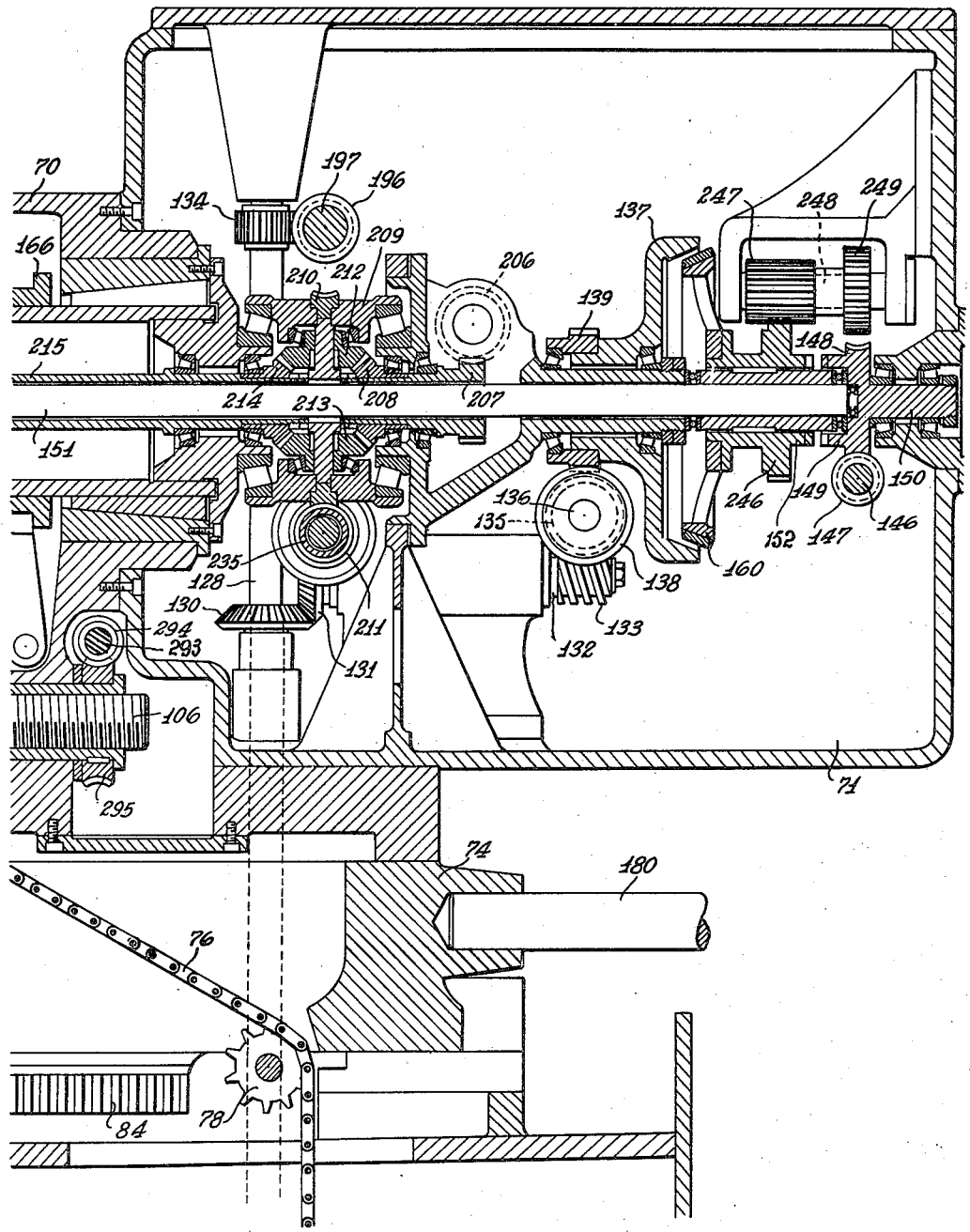
Figure 8 is a similar vertical section of the transmission casing of the machine.
Figure 9:
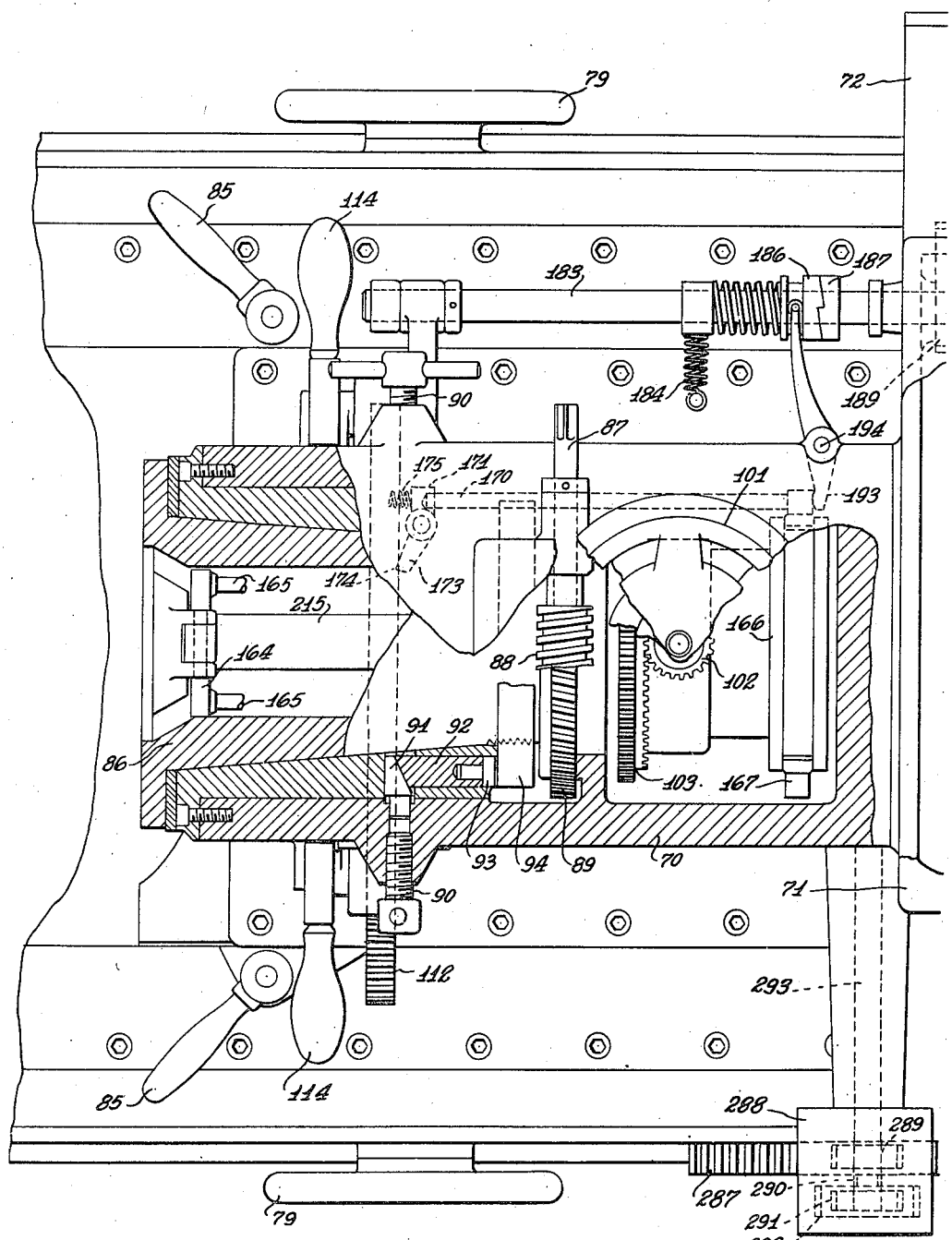
Figure 9 is a plan of the trunnion head, partly broken away and in section.
Figure 10:
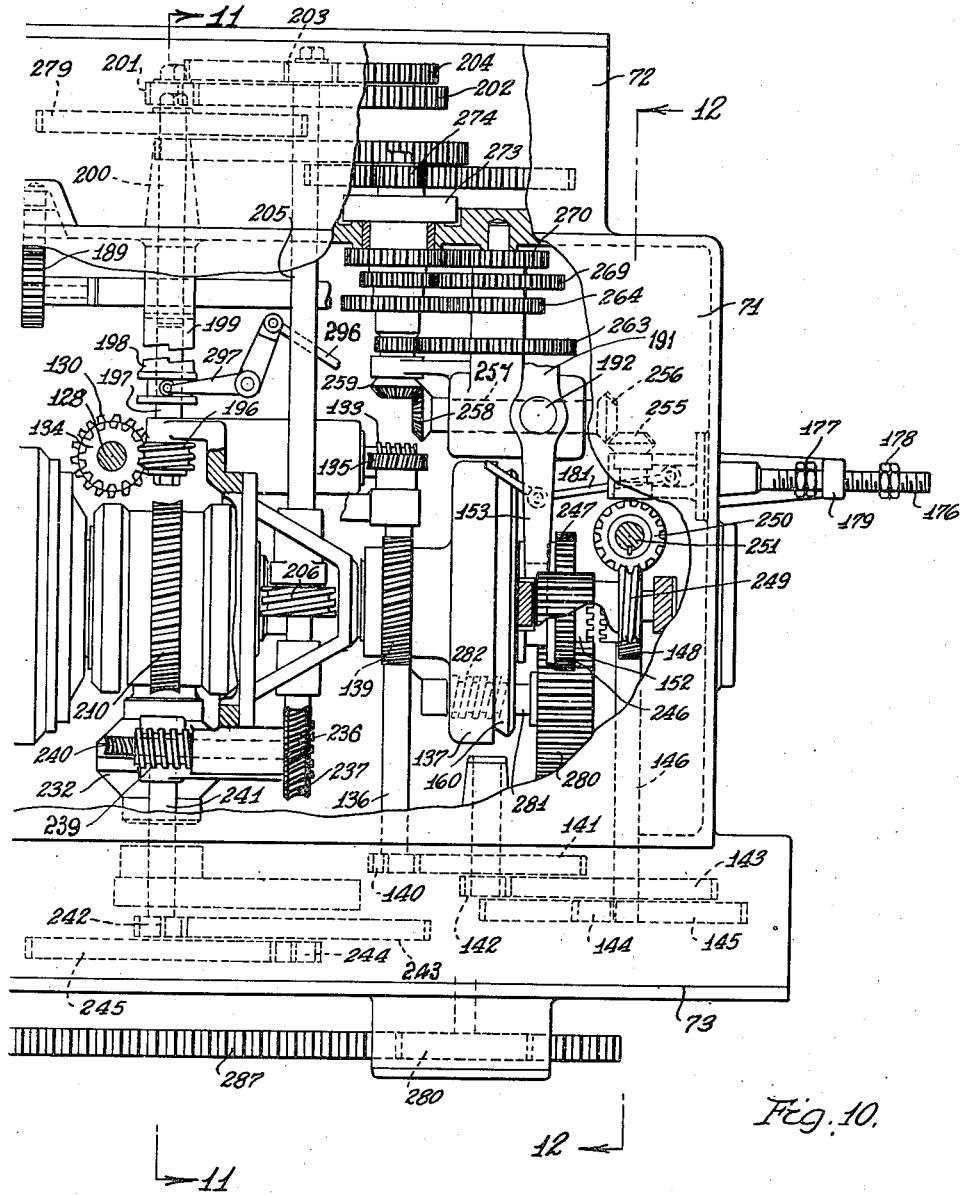
Figure 10 is a plan of the transmission casing with the cover plate partly broken away to disclose the internal mechanism.
Figure 11:
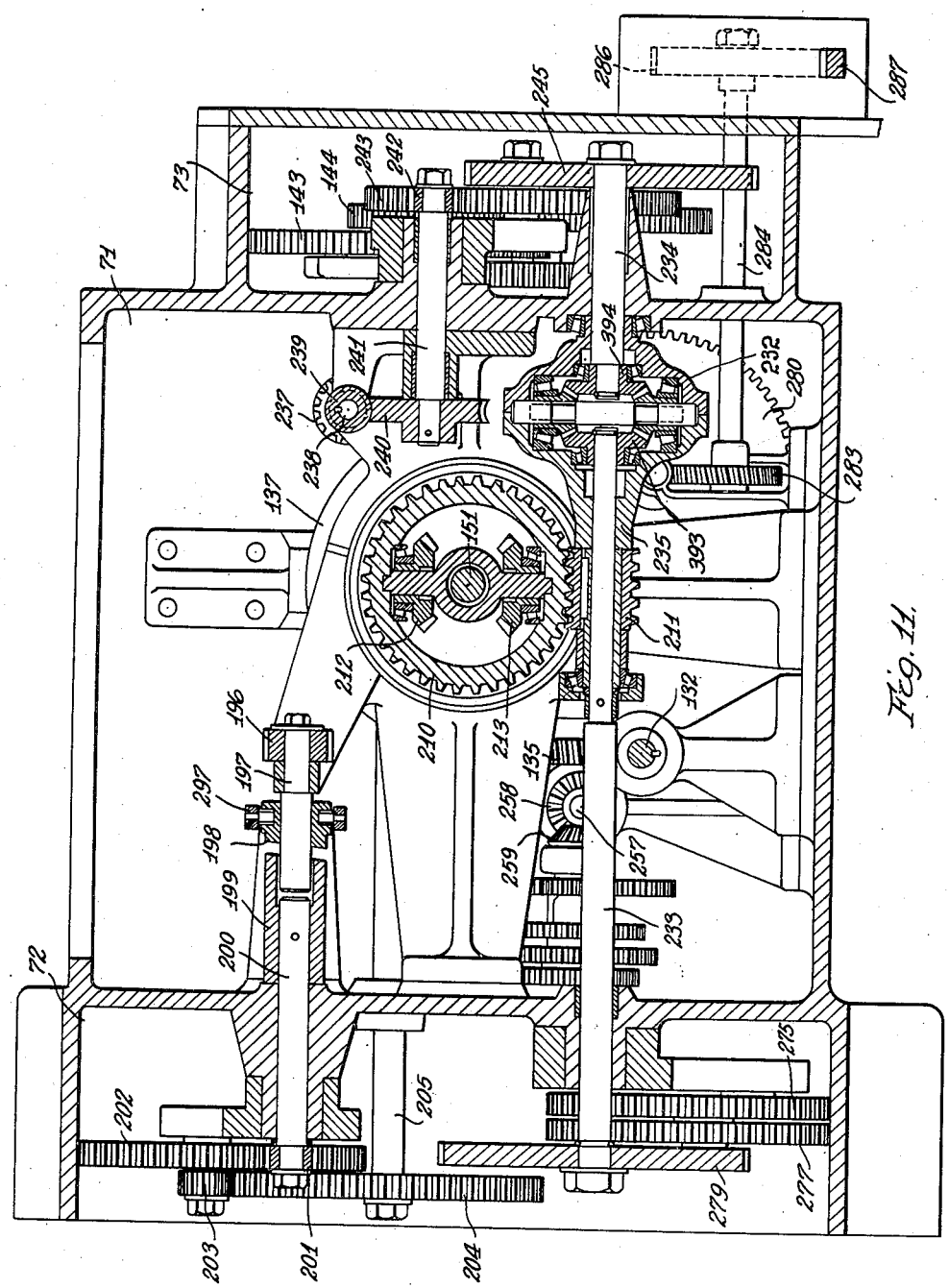
Figure 11 is a transverse section of the transmission casing taken on a plane indicated by the line 11—11, in Figure 10.
Figure 12:
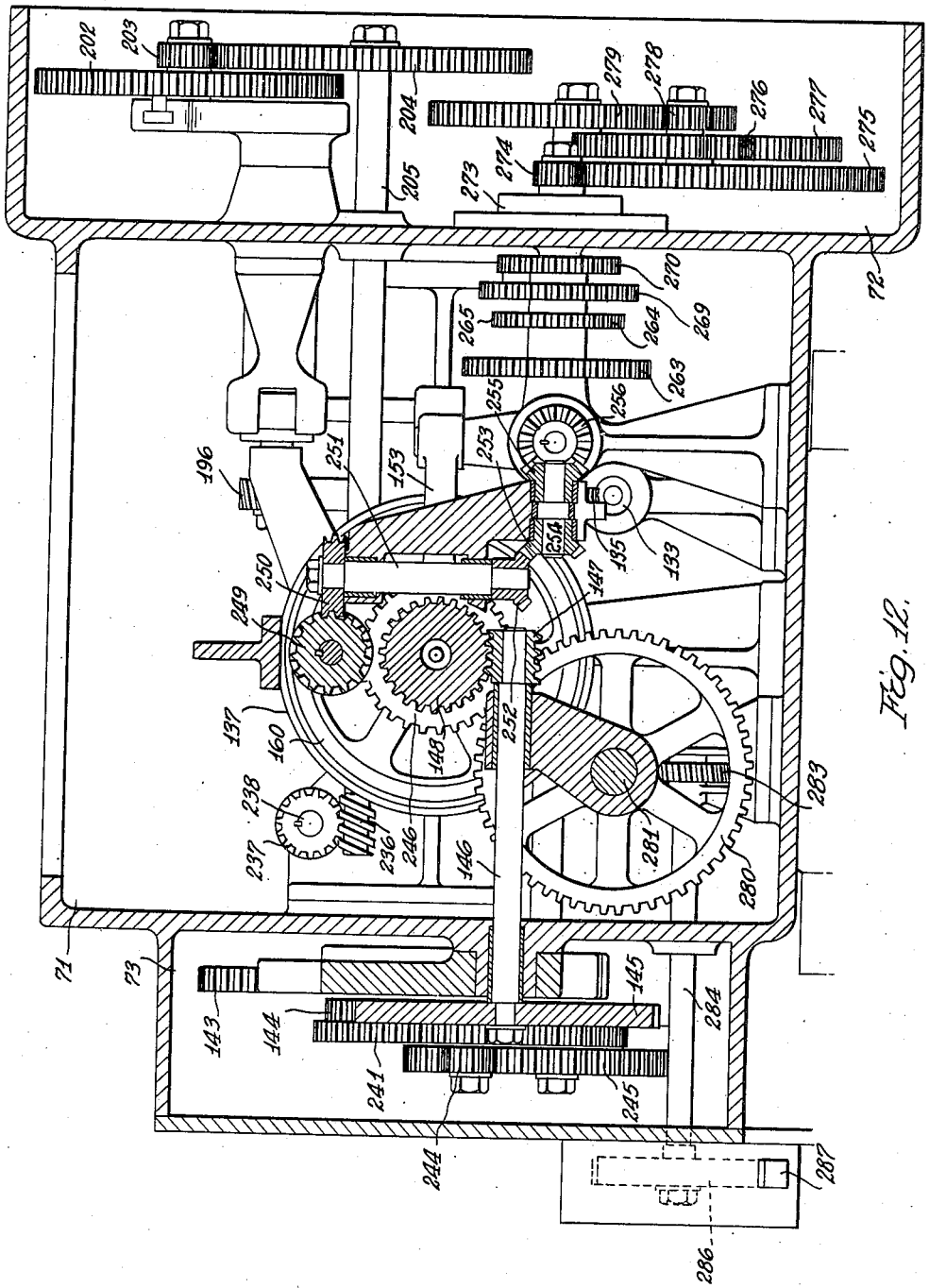
Figure 12 is a similar section taken on a plane indicated by the line 12—12, in Figure 10.
Figure 16:
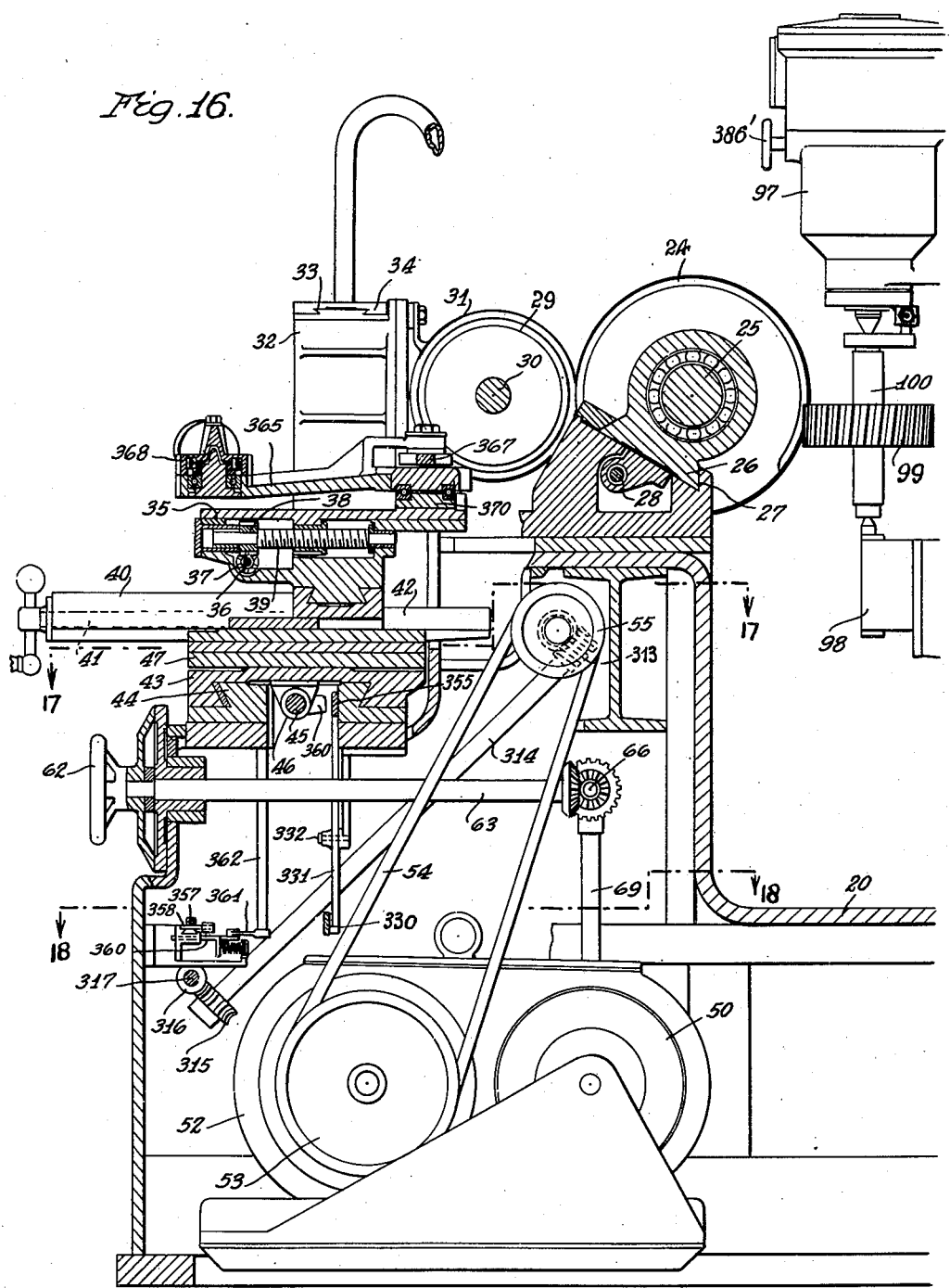
Figure 16 is a vertical section of the forward part of the machine taken on a plane indicated by the line 16—16, in Figure 3.

With the pantograph proportions taken for this example, the amplitude of movement of the tracer 373 is one-tenth of that of the said tracing disk 369. Therefore, to produce the desired contour dressing by the tracer 373 on the periphery of the dresser wheel 29, I mount, in a predetermined position on a suitable supporting extension 374 of the saddle 35, a template 375 ten times the size of the form to be ground on the dresser wheel 29. The tracing disc 369 used in that case is also ten times the diameter of the tracer diamond 373, and, the tracing disc 369 and the tracer 373 being both circular so far as their active edges are concerned, the contour of the template 375 will be faithfully reproduced to the required scale by the tracer 373 in dressing the periphery of the dresser wheel 29. In order that a correct setting of the diamond 373 may be readily determined, a location hole 400 is provided in the template 375 to receive the said pin 376 so that the pivot 370, center of the diamond 373 and center of the disc 369 may be in alignment when the pantograph elements are set in a neutral relationship as indicated in Figure 3A.

The pantograph saddle 35 is adjustable towards and from the dresser wheel 29 by means of the hand screw 36, and is carried by and movable in all directions of adjustment with the dresser wheel motor mounting. Thus the tracer 373 may be brought into any desired setting relative to the dresser wheel 29 to properly perform its wheel-dressing function, and readily withdrawn from such setting when its purpose has been accomplished.

To overcome uneven wear of the grinding wheel 24 such as would result were it to remain permanently in one axial position, the hand feed screw 28 previously referred to is used to shift the grinding wheel 24 axially from time to time relative to the axis of the work, and to compensate for this shifting I provide means for accurately rotating the work relative to the spindle 221. This may be accomplished by providing an angularly adjustable dog 402 which may be set as to its angularity by means of set screws 403 carried by the face plate of the spindle or in such other manner as convenience may dictate.

The described machine and the method of form finishing gears and similar lobed forms will economically produce accurately finished tooth forms and will permit the practical use of hardened gears under many conditions of operation where soft gears must now be used in the interest of accuracy. This means that smaller gears of finer pitch may be substituted for coarser gears since the tooth load capacities of hard gears are superior to those of soft gears in the approximate ratio of 3 to 1. It will enable present manufacturers to save the expense of ground hobs and "shaving" machinery which they now use to secure accuracy and to speed up their gear cutting operations without regard to cutter marks or form accuracy which they now exercise. By the improved methods all finish and accuracy will be secured after hardening in the grinding process.

Further, the output per machine may be quite high since the stock removal is very small and the wheel can be brought closer to the work at high speed than would be possible in a hobbing machine. The method is equally applicable to soft gears or those made from non-ferrous alloys by a mere change in the grinding wheel.

The present improved method of producing finished gear forms is considered a distinct advance over the "shaving" process, notwithstanding the fact that such shaving is generally considered to produce gears of much greater accuracy than the older methods of hobbing and production by the use of form cutters. The shaving process referred to calls for the free rotation of the gear form on centers and in mesh with the shaving tool, and the contour of the gear produced is a more or less close duplication of the errors in the shaving tool so that the accuracy of the finished gear can never be greater than that of the said shaving tool. In cases where a hunting tooth ratio exists, the contour of the gear shaved will be that of the widest tooth in the shaving tool. Also, since the shaving operation is a correcting operation which occurs before final hardening of the gear, it can have very little effect on the distortions which will eventually result from heating and quenching. Such disadvantages are not met with by my present method.

In the form-cutter method referred to, the entire range from a twelve tooth pinion to a rack is covered by a series of eight cutters, consequently the resulting tooth form is simply an approximation and is never quite correct for any gear; whereas by my improved method of form finishing gears and the like the correct form for any gear is pre-determined and readily ensured. The form cutter method is further subject to errors in spacing since it operates on the cut and index cycle.

In the hobbing method of forming gear teeth all gears of one pitch are generated by a hob whose tooth form is a rack but of course it does not lend itself to form finishing of gears after hardening as in the present case; and since it is physically impossible to prevent oxidation and scaling during heating, and distortion after quenching, hardened gears are invariably deformed after the hobbing process so that holes for axis location must be later ground to compensate for such distortion. Attempts have been made to correct these errors by lapping but this method is slow, expensive, and inaccurate.

I am aware that it is not new, broadly, to grind gears. Two general methods above adopted. The first consists of dressing a wheel to the desired shape and grinding through a tooth space, indexing, and grinding the next space; and so forth until the gear is completed. In the second method the grinding wheel is dressed in an annular manner to the contour of one-half of a rack tooth and reciprocated through the tooth space, contacting only one side of the tooth, while at the same time it is translated tangent to the pitch circle and followed by the gear in such manner as to generate an involute. The gear is then indexed and the process repeated for the first side of each tooth. The work holding arbor is afterwards inverted and the process again repeated on the second side of each tooth.

In contra-distinction to my present method it will be noted that both of the above methods are subject to the index error and that the first mentioned grinding method is also subject to a second error in that wheel wear causes the form to be progressively more shallow as each successive tooth is ground until again reaching the starting point, thus producing an eccentric pitch circle. In the second method the tooth spacing varies greatly due to a double index error plus wheel wear. All of these disadvantages are overcome by my improved method which lends itself to the production of gears of great accuracy on a commercial basis, especially as the rate of production and accuracy of dimension are not closely related to the skill of the operator.

In the drawings, for clearness of illustration, proportions have not always been strictly preserved; and also for similar reasons structural supporting elements which might otherwise obscure the mechanism have been eliminated in some of the figures of the drawings.

Herein, and in the claims, the term "gear" when referring to the work is intended to be read as being synonymous with splined, lobed, and other forms to which the improved method of finish forming is applicable.

What I claim is:

1. In a machine for the finish forming of gear teeth and other lobed forms, work rotating and feeding means including a work spindle, a grinding wheel having a continuous thread thereon of a lead which is that of the circular pitch of the teeth to be ground and of the section which is that of the conjugate rack of the gear to be ground, and a vibration damping brake tending to resist rotation of feed spindle.

2. In a gear processing machine of the type described, a transmission for effecting the rotary motion of work, said transmission including a main differential through which motion is transmitted to said work, said main differential having a rotary pinion carrying section, means in the form of a second differential controlling the rotation of said pinion carrying section, a power input shaft common to both differentials, and timing means transposed between said shaft and one of said differentials.

3. In a gear-processing machine of the type described, a transmission for effecting the rotary motion of work, said transmission including a main differential through which motion is transmitted to said work, said main differential having a rotary pinion carrying section, means in the form of a second differential controlling the rotation of said pinion carrying section, timing means controlling the operation of said second differential, and a common constant speed power input shaft coupled to the input end of said first differential and to said timing means.

4. In a gear-processing machine of the type described, a transmission for effecting the rotary motion of work, said transmission including a main differential through which motion is transmitted to said work, said main differential having a rotary pinion carrying section, means in the form of a second differential controlling the rotation of said pinion carrying section, a common constant speed power input shaft coupled to the input ends of both of said differentials, change speed means interposed between said shaft and the input end of the main differential, and further change speed means interposed between said shaft and the input end of said second differential.

5. In combination with a grinding wheel having a threaded grinding surface the thread of which is formed to continuously form finish the teeth of a gear, a transmission timing the rotation of the work to agree with the thread lead of the grinding wheel, said transmission including a main differential through which motion is transmitted to the work, said main differential having a rotary pinion carrying section, means in the form of a second differential controlling the rotation of said pinion carrying section, and timing means controlling the operation of said second differential.

6. In combination with a grinding wheel having a threaded grinding surface the thread of which is formed to continuously form finish the teeth of a gear, a transmission timing the rotation of the work to agree with the thread lead of the grinding wheel, said transmission including a main differential through which motion is transmitted to the work, said main differential having a rotary pinion carrying section, means in the form of a second differential controlling the rotation of said pinion carrying section, timing means controlling the operation of said second differential, and a common constant speed source of power coupled to the input ends of both of said differentials.

7. In combination with a grinding wheel having a threaded grinding surface the thread of which is formed to continuously form finish the teeth of a gear, a transmission timing the rotation of the work to agree with the thread lead of the grinding wheel, said transmission including a main differential through which motion is transmitted to the work, said main differential having a rotary pinion carrying section, means in the form of a second differential controlling the rotation of said pinion carrying section, timing means controlling the operation of said second differential, a common constant speed source of power coupled to the input ends of both of said differentials, change speed means interposed between said source of power and the input end of the main differentials, and further change speed means interposed between said source of power and the input end of said second differential.

8. In a machine for the finish forming of gear teeth or other lobed work, a horizontal trunnion head reciprocable longitudinally of the machine, a trunnion disposed longitudinally of the machine and mounted in said trunnion head for rotation on a horizontal axis, a vertical turntable secured on an end of said trunnion, a work table vertically slidable on said turntable, a headstock and tailstock vertically adjustable along said work table and adapted to receive a vertical work-carrying arbor, a driven grinding wheel mounted on a horizontal axis disposed transversely of the machine, means to adjust said grinding wheel transversely of the machine, and means to reciprocate said trunnion head to move the work toward and from said grinding wheel.

9. In a machine for the finish forming of gear teeth or other lobed work, a horizontal trunnion head reciprocable longitudinally of the machine, a trunnion disposed longitudinally of the machine and mounted in said trunnion head for rotation on a horizontal axis, a vertical turntable secured on an end of said trunnion, a work table vertically slidable on said turntable, a headstock and tailstock vertically adjustable along said work table and adapted to receive a vertical work-carrying arbor, a driven grinding wheel mounted on a horizontal axis disposed transversely of the machine, means to adjust said grinding wheel transversely of the machine, and means to reciprocate said trunnion head to move the work toward and from said grinding wheel, said headstock including a housing having a driven work spindle journaled therein, a stationary brake shoe secured in the housing and surrounding said spindle, a second brake shoe means urging said second brake shoe axially of said spindle into contact with said stationary brake shoe to resist rotation of said work spindle and eliminate torque flutter thereof.

10. In a machine for the finish forming of gear teeth or other lobed work, a horizontal trunnion head reciprocable longitudinally of the machine, a trunnion disposed longitudinally of the machine and mounted in said trunnion head for rotation on a horizontal axis, a vertical turntable secured on an end of said trunnion, a work table vertically slidable on said turntable, a headstock and tailstock vertically adjustable along said work table and adapted to receive a vertical work-carrying arbor, a driven grinding wheel mounted on a horizontal axis disposed transversely of the machine, means to adjust said grinding wheel transversely of the machine, and means to reciprocate said trunnion head to move the work toward and from said grinding wheel, said headstock including a driven work spindle having a face plate, and an angularly adjustable dog carried by said face plate to compensate for axial shifting of the grinding wheel.

WALTER F. ROSS.